(12) United States Patent
Tomi et al.

(10) Patent No.: US 10,879,546 B2
(45) Date of Patent: Dec. 29, 2020

(54) FUEL CELL SYSTEM AND CONTROL METHOD OF FUEL CELL SYSTEM

(71) Applicant: Toyota Jidosha Kabushiki Kaisha, Toyota (JP)

(72) Inventors: Naoki Tomi, Aichi-ken (JP); Shigeki Hasegawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/278,843

(22) Filed: Feb. 19, 2019

(65) Prior Publication Data

US 2019/0260048 A1 Aug. 22, 2019

(30) Foreign Application Priority Data

Feb. 21, 2018 (JP) ................ 2018-028496

(51) Int. Cl.
| | |
|---|---|
| H01M 8/04 | (2016.01) |
| H01M 8/04746 | (2016.01) |
| H01M 8/0438 | (2016.01) |
| H01M 8/04992 | (2016.01) |
| H01M 8/04111 | (2016.01) |
| H01M 8/04089 | (2016.01) |

(52) U.S. Cl.
CPC ... *H01M 8/04783* (2013.01); *H01M 8/04104* (2013.01); *H01M 8/04111* (2013.01); *H01M 8/04395* (2013.01); *H01M 8/04432* (2013.01); *H01M 8/04753* (2013.01); *H01M 8/04992* (2013.01)

(58) Field of Classification Search
CPC ......... H01M 8/04783; H01M 8/04395; H01M 8/04432; H01M 8/04992; H01M 8/04111; H01M 8/04753; H01M 8/04104; H01M 8/04089

See application file for complete search history.

(56) References Cited

FOREIGN PATENT DOCUMENTS

JP 2009-123550 A 6/2009

*Primary Examiner* — Cynthia K Walls
(74) *Attorney, Agent, or Firm* — Dinsmore & Shohl LLP

(57) ABSTRACT

When setting a requested operating point of a compressor that supplies oxidizing gas to a fuel cell by a target flow rate and a target pressure ratio, a control section of a fuel cell system sets the target pressure ratio to be equal to or higher than a minimum pressure ratio corresponding to the target flow rate using a predetermined operation characteristic in which a minimum pressure ratio that can be realized to the flow rate that can be discharged from the compressor. In the case where a condition under which it should be determined that the minimum value of the pressure ratio in an actual operation characteristic of the compressor differs from the minimum pressure ratio in the predetermined operation characteristic is satisfied, the control section updates the minimum pressure ratio in the predetermined operation characteristic using the minimum value of the pressure ratio in the actual operation characteristic.

7 Claims, 11 Drawing Sheets

FUEL CELL SYSTEM AND CONTROL METHOD OF FUEL CELL SYSTEM

CROSS-REFERENCE TO RELATED APPLICATION

This application claims priority to Japanese Patent Application No. 2018-028496 filed on Feb. 21, 2018, incorporated herein by reference in its entirety.

BACKGROUND

1. Technical Field

The disclosure relates to a fuel cell system and a method of the fuel cell system.

2. Description of Related Art

Conventionally, a fuel cell system that supplies oxidizing gas to a fuel cell by using a compressor has been known. There is a case where a requested operating point indicative of a pressure ratio and a flow rate is set for the compressor on the basis of an output request to the fuel cell, and the like. In a fuel cell system disclosed in Japanese Patent Application Publication No. 2009-123550 (JP 2009-123550 A), in order to avoid surging that possibly occurs at the low flow rate, in the case where the requested operating point falls within a surge region, the flow rate is increased, and the excessive oxidizing gas is made to flow through a bypass channel.

SUMMARY

The present inventors have found existence of an operating region within which the operating point of the compressor cannot be controlled to a target operating point and which differs from the surge region concerned in JP 2009-123550 A in a fuel cell system using a turbo compressor. Such a region is an operating region with the high flow rate and the low pressure ratio. In the turbo compressor, an amount of pressure loss is increased in a downstream-side flow channel when the flow rate is increased. Thus, in a high flow rate region, such a minimum value (a lower limit value) of the pressure ratio at which the pressure ratio cannot be lowered any more exists. When a valve that is provided in a channel through which the oxidizing gas is supplied from the compressor to the fuel cell or in a channel through which the oxidizing gas is exhausted from the fuel cell is in a fully opened state, a value of the pressure ratio with respect to the flow rate at the operating point becomes the minimum value (the lower limit value). Thus, the requested operating point at which the pressure ratio falls below the lower limit value cannot be realized by changing an opening degree of the valve. In addition, when a rotational speed of the compressor is reduced to lower the pressure ratio, the flow rate is also reduced. Thus, the flow rate and the pressure ratio at the requested operating point cannot be realized simultaneously. The present inventors have found such a possibility that, in the case where the pressure ratio at the requested operating point is lower than the minimum value of the pressure ratio with respect to the flow rate at the same requested operating point, the requested operating point of the compressor cannot be realized.

(1) A first aspect of the disclosure relates to a fuel cell system that includes: a fuel cell; a turbo compressor that supplies oxidizing gas to the fuel cell; a pressure regulating valve that regulates a pressure of the oxidizing gas in the fuel cell; and a control section that is configured to control operations of the turbo compressor and the pressure regulating valve in accordance with at least an output request to the fuel cell. The control section is configured to: set a requested operating point of the turbo compressor by using a target flow rate and a target pressure ratio, the target flow rate being a target value of a flow rate of the oxidizing gas that is discharged from the turbo compressor, and the target pressure ratio being a target value of a pressure ratio that is a ratio of a pressure of the oxidizing gas discharged from the turbo compressor to a pressure of the oxidizing gas that is suctioned into the turbo compressor; when the requested operating point is set, set the target pressure ratio to be equal to or higher than a minimum pressure ratio that corresponds to the target flow rate by using a predetermined operation characteristic in which the minimum pressure ratio is predetermined, the minimum pressure ratio being a minimum value of the pressure ratio that can be realized with respect to the flow rate of the oxidizing gas that can be discharged from the turbo compressor; and in the case where a condition under which it should be determined that the minimum value of the pressure ratio in an actual operation characteristic of the turbo compressor differs from the minimum pressure ratio in the predetermined operation characteristic is satisfied, update the minimum pressure ratio in the predetermined operation characteristic by using the minimum value of the pressure ratio in the actual operation characteristic.

According to the fuel cell system of this aspect, when the requested operating point is set, the target pressure ratio is set to be equal to or higher than the minimum pressure ratio that corresponds to the target flow rate by using the operation characteristic in which the minimum is predetermined, and the minimum pressure ratio is the minimum value of the pressure ratio that can be realized with respect to the flow rate of the oxidizing gas that can be discharged from the turbo compressor. Accordingly, it is possible to suppress the operation of the turbo compressor at the requested operating point that cannot be realized. Thus, it is possible to suppress degraded performance of the fuel cell system, which is caused by continuously operating the turbo compressor at the requested operating point that cannot be realized. For example, in the case where feedback control that at least includes a proportional term and an integral term is executed on a deviation between the requested operating point and an actual operating point, accumulation of the feedback integral terms can be suppressed. Thus, it is possible to suppress a delay in control when the requested operating point is changed.

In addition, in the case where the predetermined condition under which it should be determined that the minimum value of the pressure ratio in the actual operation characteristic of the turbo compressor differs from the minimum pressure ratio in the predetermined operation characteristic is satisfied, the minimum pressure ratio in the predetermined operation characteristic is updated by using the minimum value of the pressure ratio in the actual operation characteristic. Accordingly, it is possible to further suppress the operation of the turbo compressor at the requested operating point that cannot be realized. For this reason, for example, in the case where the feedback control that at least includes the proportional term and the integral term is executed on the deviation between the requested operating point and the actual operating point, the accumulation of the feedback integral terms can further be suppressed. In addition, it is possible to further suppress the delay in the control when the requested operating point is changed. Furthermore, it is possible to prevent setting of the target pressure ratio at the requested operating point from becoming excessively higher than the minimum value of the pressure ratio in the actual operation characteristic of the turbo compressor. Thus, degraded fuel economy can be suppressed. Moreover, the minimum pressure ratio in the predetermined operation characteristic is updated in the case where the predetermined condition is satisfied. Thus, compared to a configuration in which the minimum pressure ratio in the predetermined operation characteristic is updated regardless of the satisfaction or non-satisfaction of such a condition, it is possible to suppress an increase in a load that is required for processing in the control section.

(2) In the fuel cell system of the above aspect, the control section may be configured to set the target pressure ratio at the requested operating point again by using the updated minimum pressure ratio. According to the fuel cell system of this aspect, since the target pressure ratio at the requested operating point is set again by using the updated minimum pressure ratio, the target pressure ratio at the requested operating point can be set to the minimum pressure ratio in the actual operation characteristic. In this way, it is possible to further suppress the operation of the turbo compressor at the requested operating point that cannot be realized.

(3) The fuel cell system of the above aspect may further include: a pressure sensor that identifies the pressure ratio; and a flow rate sensor that identifies the flow rate. The control section may identify an actual operating point as an operating point that indicates the actual pressure ratio and the actual flow rate of the turbo compressor by using a measurement result of the pressure sensor and a measurement result of the flow rate sensor, and the predetermined condition may be a condition that the pressure regulating valve is fully opened and that the requested operating point and the actual operating point are different from each other. According to the fuel cell system of this aspect, in the case where the pressure regulating valve is fully opened and where the requested operating point and the actual operating point are different from each other, the minimum pressure ratio in the predetermined operation characteristic is updated. Thus, the minimum pressure ratio in the predetermined operation characteristic can be updated in an appropriate case where there is a high possibility that the minimum pressure ratio in the predetermined operation characteristic and the minimum pressure ratio in the actual operation characteristic differ from each other.

(4) In the fuel cell system of the above aspect, the predetermined condition may be a condition that the pressure regulating valve is fully opened and that the requested operating point and the actual operating point are different from each other for a predetermined time or longer. According to the fuel cell system of this aspect, in the case where the pressure regulating valve is fully opened and where the requested operating point and the actual operating point are different from each other for the predetermined time or longer, the minimum pressure ratio in the predetermined operation characteristic is updated. Thus, hunting can be suppressed.

(5) The fuel cell system of the above aspect may further include: a pressure sensor that identifies the pressure ratio; and a flow rate sensor that identifies the flow rate. The control section may identify an actual operating point as an operating point that indicates the actual pressure ratio and the actual flow rate of the turbo compressor by using a measurement result of the pressure sensor and a measurement result of the flow rate sensor, and the predetermined condition may be a condition that the pressure regulating valve is not fully opened and that the actual pressure ratio at the actual operating point is different from the minimum pressure ratio in the predetermined operation characteristic. According to the fuel cell system of this aspect, in the case where the pressure regulating valve is not fully opened and where the actual pressure ratio at the actual operating point is different from the minimum pressure ratio in the predetermined operation characteristic, the minimum pressure ratio in the predetermined operation characteristic is updated. Thus, the minimum pressure ratio in the predetermined operation characteristic can be updated in the appropriate case where there is the high possibility that the minimum pressure ratio in the predetermined operation characteristic and the minimum pressure ratio in the actual operation characteristic differ from each other. In addition, it is possible to prevent setting of the target pressure ratio at the requested operating point from becoming excessively higher than the minimum value of the pressure ratio in the actual operation characteristic of the air compressor. Thus, the degraded fuel economy can be suppressed.

(6) The fuel cell system of the above aspect may further include: an oxidizing gas supply channel through which the oxidizing gas is supplied from the turbo compressor to the fuel cell; an oxidizing gas exhaust channel through which the oxidizing gas is discharged from the fuel cell; a bypass channel that communicates between the oxidizing gas supply channel and the oxidizing gas exhaust channel; and a bypass valve provided on the bypass channel. The predetermined condition may be a condition that an opening degree of the bypass valve is changed. According to the fuel cell system of this aspect, the minimum pressure ratio in the predetermined operation characteristic is updated in the case where the opening degree of the bypass valve is changed. Thus, the minimum pressure ratio in the predetermined operation characteristic can be updated in the appropriate case where there is the high possibility that the minimum pressure ratio in the predetermined operation characteristic and the minimum pressure ratio in the actual operation characteristic differ from each other. In addition, it is possible to prevent setting of the target pressure ratio at the requested operating point from becoming excessively higher than the minimum value of the pressure ratio in the actual operation characteristic of the air compressor. Thus, the degraded fuel economy can be suppressed.

(7) In the fuel cell system of the above aspect, the predetermined condition may be a condition that the bypass valve is opened from a fully closed state. According to the fuel cell system of this aspect, the minimum pressure ratio in the predetermined operation characteristic is updated in the case where the bypass valve is opened from the fully closed state. Thus, the minimum pressure ratio in the predetermined operation characteristic can be updated in the appropriate case where there is the high possibility that the minimum pressure ratio in the predetermined operation characteristic and the minimum pressure ratio in the actual operation characteristic differ from each other.

(8) A second aspect of the disclosure relates to a control method of a fuel cell system having: a fuel cell; a turbo compressor that supplies oxidizing gas to the fuel cell; and a pressure regulating valve that regulates a pressure of the oxidizing gas in the fuel cell. This control method includes: setting a requested operating point of the turbo compressor by using a target flow rate as a target value of a flow rate of the oxidizing gas discharged from the turbo compressor and a target pressure ratio as a target value of a pressure ratio that is a ratio of a pressure of the oxidizing gas discharged from the turbo compressor to a pressure of the oxidizing gas suctioned into the turbo compressor, the target pressure ratio being set to be equal to or higher than a minimum pressure ratio that corresponds to the target flow rate by using a predetermined operation characteristic in which the minimum pressure ratio as a minimum value of the pressure ratio that can be realized with respect to the flow rate of the oxidizing gas that can be discharged from the turbo compressor is set in advance; and, in the case where a predetermined condition under which it should be determined that the minimum value of the pressure ratio in an actual operation characteristic of the turbo compressor differs from the minimum pressure ratio in the predetermined operation characteristic is satisfied, updating the minimum pressure ratio in the predetermined operation characteristic by using the minimum value of the pressure ratio in the actual operation characteristic.

The disclosure can also be realized in various aspects other than the fuel cell system. For example, the disclosure can be realized by an aspect such as a vehicle that includes the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

A. First Embodiment

Figure 1:
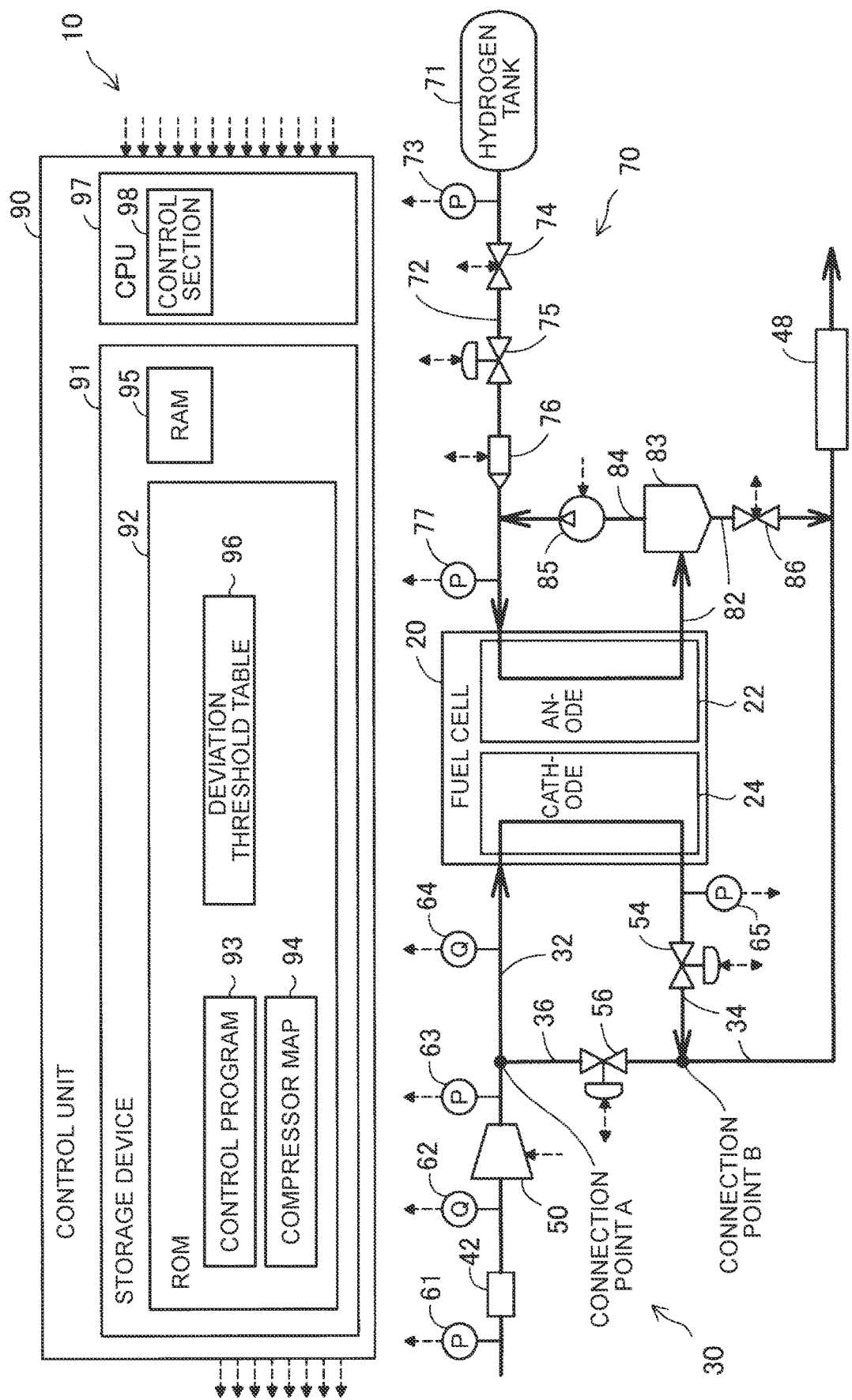
FIG. 1 is an explanatory diagram of a schematic configuration of a fuel cell system.

A-1. Configuration of Fuel Cell System:

FIG. 1 is an explanatory diagram of a schematic configuration of a fuel cell system 10 as an embodiment of the disclosure. As a system that provides a drive power supply, the fuel cell system 10 is mounted on a fuel cell vehicle (not shown). The fuel cell system 10 supplies power to loads such as a drive motor, an air compressor 50, and the like of the fuel cell vehicle.

The fuel cell system 10 includes a fuel cell 20, an oxidizing gas supply/exhaust system 30, a fuel gas supply/exhaust system 70, and a control unit 90.

The fuel cell 20 is a power supply of the fuel cell system 10 and is constructed of a so-called solid polymer fuel cell. The fuel cell 20 generates the power when being supplied with fuel gas and oxidizing gas. Instead of the solid polymer fuel cell, the fuel cell 20 may be constructed of a fuel cell of another arbitrary type such as a solid oxide fuel cell. The fuel cell 20 has a stacking structure in which plural unit cells (not shown) are stacked. Each of the unit cells has: a membrane-electrode assembly (not shown) in which an electrode is arranged on each surface of an electrolyte membrane (not shown); and paired separators (not shown) that hold the membrane-electrode assembly therebetween. Each of the unit cells constituting the fuel cell 20 is formed with an anode 22 to which the fuel gas is supplied and a cathode 24 to which the oxidizing gas is supplied via the electrolyte membrane. FIG. 1 schematically shows only the anode 22 and the cathode 24 of the single unit cell.

The oxidizing gas supply/exhaust system 30 supplies air as the oxidizing gas to the fuel cell 20 and exhausts the air therefrom. The oxidizing gas supply/exhaust system 30 has an atmospheric pressure sensor 61, an oxidizing gas supply channel 32, an air cleaner 42, an airflow meter 62, the air compressor 50, a pressure sensor 63, a flow rate sensor 64, an oxidizing gas exhaust channel 34, a pressure regulating valve 54, a cathode pressure sensor 65, a muffler 48, a bypass channel 36, and a bypass valve 56.

The oxidizing gas supply channel 32 constitutes a channel of the air to be supplied to the fuel cell 20. The atmospheric pressure sensor 61 is arranged at an entry of the oxidizing gas supply channel 32 and detects an atmospheric pressure. The air cleaner 42 is arranged in the oxidizing gas supply channel 32, and removes dust when the air is introduced thereinto. The airflow meter 62 detects a flow rate of the air that is introduced into the air cleaner 42.

The air compressor 50 compresses the air and delivers the compressed air to the fuel cell 20 in response to a command from a control section 98. The air compressor 50 is configured as a so-called turbo air compressor that compresses the air when a rotating body (not shown) rotates in a casing. As the air compressor 50, for example, a centrifugal compressor in which an impeller rotates to compress the air or an axial-flow compressor in which a rotor blade (a rotor) rotates to compress the air may be used. The rotating body such as the impeller is driven by a motor (not shown). Thus, when a rotational speed of the rotating body is controlled by regulating a voltage or a current applied to such a motor, driving of the air compressor 50 can be controlled.

The pressure sensor 63 is arranged on a downstream side of the air compressor 50 and measures an exit pressure of the air compressor 50 in the oxidizing gas supply channel 32. In the oxidizing gas supply channel 32, the flow rate sensor 64 is arranged near the fuel cell 20 from a connection point A between the oxidizing gas supply channel 32 and the bypass channel 36. The flow rate sensor 64 measures a flow rate of the air to be supplied to the fuel cell 20.

The oxidizing gas exhaust channel 34 constitutes a channel of cathode exhaust gas that is exhausted from the fuel cell 20. In the oxidizing gas exhaust channel 34, the pressure regulating valve 54 is arranged near the fuel cell 20 from a connection point B between the oxidizing gas exhaust channel 34 and the bypass channel 36. The pressure regulating valve 54 regulates a pressure of the cathode 24 when an opening degree thereof is changed in response to a command from the control section 98. The pressure of the cathode 24 is lowered as the opening degree of the pressure regulating valve 54 is increased, and is increased as the opening degree of the pressure regulating valve 54 is reduced. In the oxidizing gas exhaust channel 34, the cathode pressure sensor 65 is arranged between the pressure regulating valve 54 and the fuel cell 20. The cathode pressure sensor 65 detects the pressure of the cathode 24. In the oxidizing gas exhaust channel 34, the muffler 48 is arranged on a downstream side of the connection point B between the oxidizing gas exhaust channel 34 and the bypass channel 36. The muffler 48 reduces exhaust sound of the cathode exhaust gas.

The bypass channel 36 communicates between the oxidizing gas supply channel 32 and the oxidizing gas exhaust channel 34. The bypass channel 36 is connected to the oxidizing gas supply channel 32 at the connection point A and is connected to the oxidizing gas exhaust channel 34 at the connection point B. The bypass valve 56 is arranged in the bypass channel 36, and regulates the flow rate of the air that flows through the bypass channel 36 when an opening degree of the bypass valve 56 is changed in response to a command from the control section 98. Accordingly, the air that is exhausted from the air compressor 50 partially flows into the bypass channel 36 in accordance with the opening degree of the bypass valve 56 and is exhausted from the oxidizing gas exhaust channel 34 to the atmosphere without flowing through the fuel cell 20. In the case where the bypass valve 56 is closed, all the air that is discharged from the air compressor 50 is supplied to the fuel cell 20. The bypass valve 56 is normally closed, and is opened in response to the command from the control section 98.

The fuel gas supply/exhaust system 70 supplies hydrogen as the fuel gas that is supplied from a hydrogen tank 71 to the fuel cell 20 and exhausts hydrogen therefrom. The fuel gas supply/exhaust system 70 has the hydrogen tank 71, a fuel gas supply channel 72, a tank pressure sensor 73, a main stop valve 74, an anode pressure regulating valve 75, an injector 76, an anode pressure sensor 77, a fuel gas exhaust channel 82, a gas-liquid separator 83, a circulation pipe 84, a hydrogen pump 85, and an exhaust/drain valve 86.

The hydrogen tank 71 stores high-pressure hydrogen. The fuel gas supply channel 72 constitutes a channel of hydrogen that is supplied from the hydrogen tank 71 to the fuel cell 20. The tank pressure sensor 73 detects a pressure of the hydrogen tank 71. In the fuel gas supply channel 72, the main stop valve 74, the anode pressure regulating valve 75, the injector 76, and the anode pressure sensor 77 are arranged in this order from a side near the hydrogen tank 71. The main stop valve 74 turns on/off a supply of hydrogen from the hydrogen tank 71 in response to a command from the control section 98. The anode pressure regulating valve 75 regulates a pressure of hydrogen to be supplied to the fuel cell 20. The injector 76 is constructed of an electromagnetic drive on-off valve, is driven in accordance with a drive cycle or a valve opening time that is set by the control section 98, and injects hydrogen. In the fuel gas supply channel 72, the anode pressure sensor 77 is arranged near the fuel cell 20 from a connection portion between the fuel gas supply channel 72 and the circulation pipe 84, and detects a pressure of the anode 22.

The fuel gas exhaust channel 82 constitutes a channel of anode exhaust gas that is exhausted from the fuel cell 20. An exit of the fuel gas exhaust channel 82 is connected to a downstream side of the connection point B with the bypass channel 36 in the oxidizing gas exhaust channel 34. The gas-liquid separator 83 is arranged in the fuel gas exhaust channel 82 and separates liquid water from the anode exhaust gas that contains the liquid water and is exhausted from the fuel cell 20. The circulation pipe 84 connects the gas-liquid separator 83 and a portion of the fuel gas supply channel 72 on the fuel cell 20 side from the injector 76. The hydrogen pump 85 is arranged in the circulation pipe 84 and circulates the anode exhaust gas that has not been used for an electrochemical reaction and that contains hydrogen through the fuel gas supply channel 72. The exhaust/drain valve 86 is arranged in a portion of the fuel gas exhaust channel 82 on a downstream side of the gas-liquid separator 83. The exhaust/drain valve 86 is normally closed, and is opened in response to a command from the control section 98. In this way, the liquid water, which is separated by the gas-liquid separator 83, and impurity gas are exhausted to the outside of the fuel cell system 10.

The control unit 90 is constructed of an electronic control unit (ECU) and includes a storage device 91 and a CPU 97. The storage device 91 is configured to include storage media such as ROM 92 and RAM 95. The ROM 92 stores a control program 93, a compressor map 94, and a deviation threshold table 96. The CPU 97 loads and executes the control program 93 and thereby functions as the control section 98. The compressor map 94 is created in advance as a map that indicates an operation characteristic of the air compressor 50. The deviation threshold table 96 is created in advance as a table that indicates a threshold of a control deviation, which will be described below. A detailed description on the compressor map 94 and the deviation threshold table 96 will be made below.

The control section 98 controls the entire fuel cell system 10. The control section 98 receives detection signals from an accelerator operation amount sensor (not shown), a vehicle speed sensor (not shown), and the like of the fuel cell vehicle in addition to the various sensors provided in the fuel cell system 10 including: sensors such as the atmospheric pressure sensor 61, the airflow meter 62, the pressure sensor 63, the flow rate sensor 64, the cathode pressure sensor 65, the tank pressure sensor 73, and the anode pressure sensor 77; and opening degree sensors (not shown) provided in the various valves such as the pressure regulating valve 54, the bypass valve 56, the main stop valve 74, the anode pressure regulating valve 75, the injector 76, and the exhaust/drain valve 86. In addition, the control section 98 outputs drive signals to: the various valves such as the pressure regulating valve 54, the bypass valve 56, the main stop valve 74, the anode pressure regulating valve 75, the injector 76, and the exhaust/drain valve 86; the air compressor 50; the hydrogen pump 85; and the like, and controls an operation of each of the components. Furthermore, the control section 98 executes requested operating point setting processing and minimum pressure ratio updating processing, which will be described below.

Figure 2:
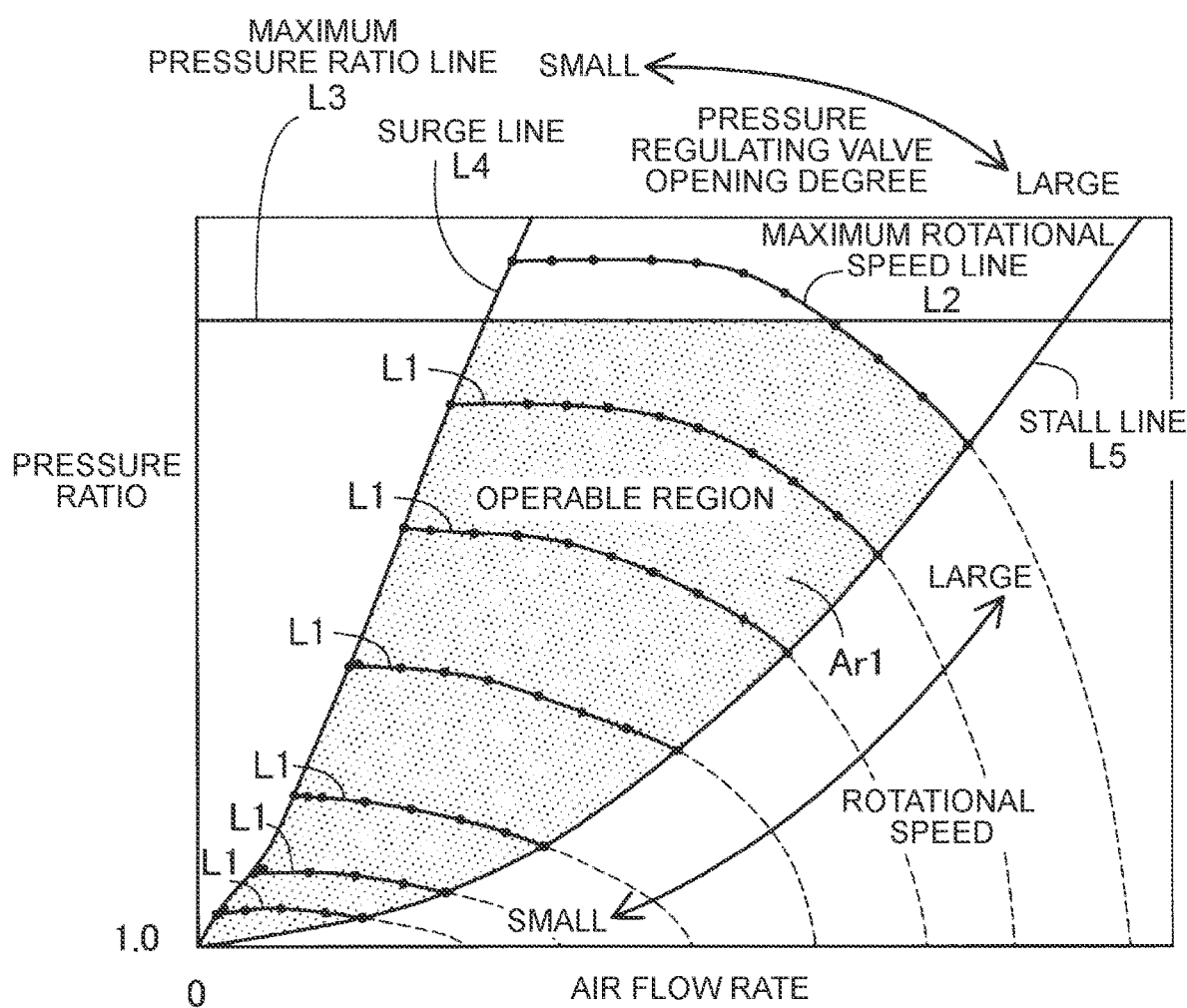
FIG. 2 is an explanatory graph for illustrating an operation characteristic of an air compressor.

FIG. 2 is a graph for illustrating the operation characteristic of the air compressor 50. In FIG. 2, a vertical axis represents a pressure ratio of the air compressor 50, and a horizontal axis represents an air flow rate (hereinafter also simply referred to as a "flow rate") that is discharged from the air compressor 50. The pressure ratio of the air compressor 50 means a ratio of a pressure of the air that is discharged from the air compressor 50 to a pressure of the air that is suctioned into the air compressor 50. In this embodiment, the pressure of the air that is suctioned into the air compressor 50 approximates the atmospheric pressure detected by the atmospheric pressure sensor 61. In addition, in this embodiment, the pressure of the air that is discharged from the air compressor 50 corresponds to the exit pressure of the air compressor 50 detected by the pressure sensor 63.

FIG. 2 shows the operation characteristic of the air compressor 50 in a closed state of the bypass valve 56. The operation characteristic of the air compressor 50 as the turbo air compressor means a relationship between the pressure ratio and the flow rate that is determined by a rotational speed of the rotating body in the air compressor 50 (hereinafter also simply referred to as the "rotational speed") and the opening degree of the pressure regulating valve 54. FIG. 2 shows uniform rotational speed lines L1, each of which is drawn by connecting plural black dots indicative of operating points, in the case where the rotational speed remains constant and the opening degree of the pressure regulating valve 54 is changed. The plural black dots, each of which indicates the operating point, is measured and calculated in advance in the fuel cell system 10 shown in FIG. 1. As shown in FIG. 2, the pressure ratio and the flow rate of the air compressor 50 depend on each other. The pressure ratio is reduced as the opening degree of the pressure regulating valve 54 is increased, and is increased as the rotational speed is increased. Meanwhile, the flow rate is increased as the opening degree of the pressure regulating valve 54 is increased, and is increased as the rotational speed is increased. In the case where the opening degree of the pressure regulating valve 54 is relatively small, a change in the pressure ratio with respect to a change in the flow rate is relatively small.

In addition to the plural uniform rotational speed lines L1 at the different rotational speeds, FIG. 2 shows a maximum rotational speed line L2, a maximum pressure ratio line L3, a surge line L4, and a stall line L5. In FIG. 2, lines that extend from the uniform rotational speed lines L1 to a lower side of the stall line L5 are shown by broken lines.

The maximum rotational speed line L2 means the uniform rotational speed line at a maximum rotational speed that is determined in accordance with a specification of the air compressor 50. The maximum pressure ratio line L3 means a maximum pressure ratio that is determined in accordance with the specification of the air compressor 50. Thus, the maximum pressure ratio line L3 is constant regardless of the flow rate. The surge line LA is predetermined to avoid surging that possibly occurs at the low flow rate. A region on a left side of the surge line LA is also referred to as a surge region and means a region where the surging possibly occurs. When the surging occurs, the air compressor 50 possibly receives an extreme shock, or the regulation of the flow rate possibly becomes difficult. The surge line IA is obtained in advance in the fuel cell system 10 shown in FIG. 1 based on the result of measurement.

The stall line L5 is drawn by connecting plural plots, each of which indicates the operating point, in the case where the pressure regulating valve 54 is in a fully opened state. A region on the lower side of the stall line L5 is an operating region that cannot be realized by the air compressor 50 because the opening degree of the pressure regulating valve 54 exceeds an upper limit thereof. The stall line L5 is obtained in advance in the fuel cell system 10 shown in FIG. 1 based on the result of the measurement. The stall line L5 may be predetermined on the basis of a pressure loss value that is calculated from the air flow rate of each of the components such as the fuel cell 20 and the oxidizing gas supply channel 32. That is, the stall line L5 means a minimum pressure ratio that is a minimum value of the pressure ratio with respect to the flow rate in the operation characteristic of the air compressor 50.

In FIG. 2, a region surrounded by the maximum rotational speed line L2, the maximum pressure ratio line L3, the surge line L4, and the stall line L5 is dotted as an operable region Ar1 of the air compressor 50. In the compressor map 94 shown in FIG. 1, each dot in the operable region Ar1, that is, each combination of the pressure ratio and the flow rate is predetermined as the operation characteristic of the air compressor 50. In addition, in the compressor map 94, formulas expressing the uniform rotational speed line L1, the maximum rotational speed line L2, the maximum pressure ratio line L3, the surge line L4, and the stall line L5 are predetermined.

In the fuel cell system 10 of this embodiment, the control section 98 executes the requested operating point setting processing, which will be described below, to set a requested operating point in the operable region Ar1 of the air compressor 50. The requested operating point is an operating point on which the air compressor 50 is instructed.

In this embodiment, the air compressor 50 can be regarded as a specific concept of the turbo compressor in SUMMARY, and the pressure sensor 63 can be regarded as a specific concept of the pressure sensor in SUMMARY. In addition, the compressor map 94 can be regarded as a specific concept of the predetermined operation characteristic in SUMMARY, and the stall line L5 can be regarded as a specific concept of the minimum pressure ratio in the predetermined operation characteristic in SUMMARY.

Figure 3:
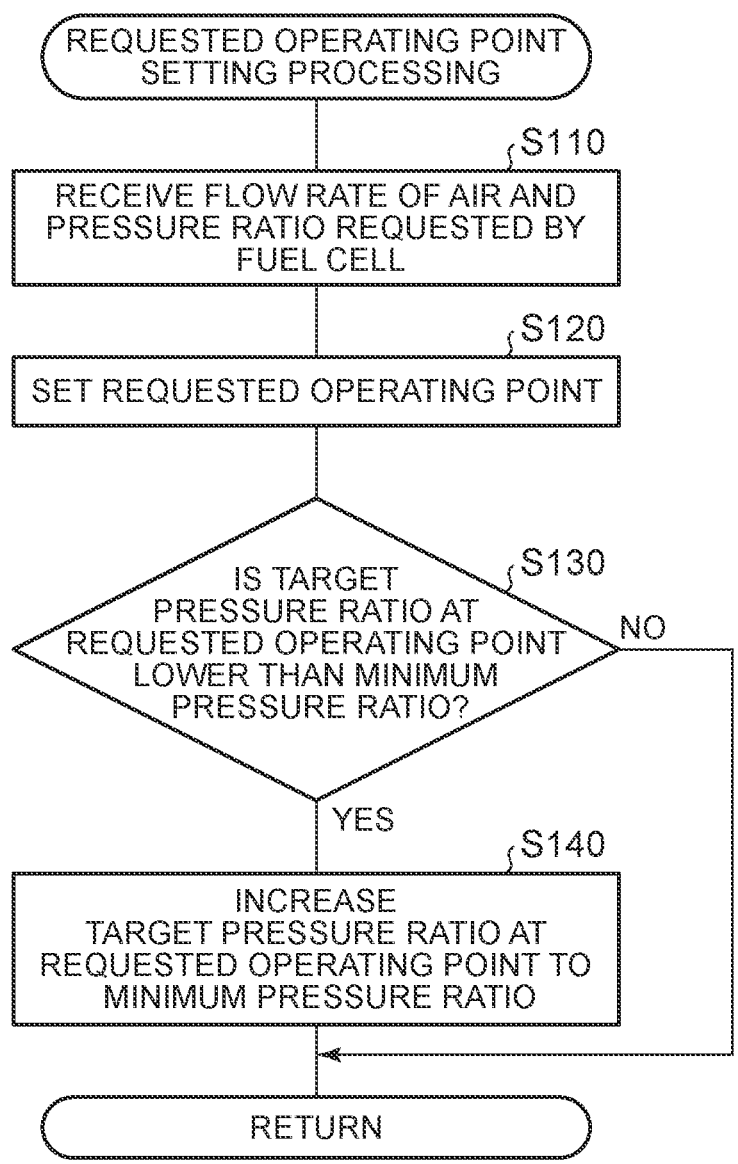
FIG. 3 is a flowchart of a procedure of requested operating point setting processing.

A-2. Requested Operating Point Setting Processing:

FIG. 3 is a flowchart of a procedure of the requested operating point setting processing. Once a starter switch (not shown) of the fuel cell vehicle is pressed, and the fuel cell system 10 starts, the requested operating point setting processing is repeatedly executed.

The control section 98 receives the flow rate of the air and the pressure ratio that are requested by the fuel cell 20 (step S110). The flow rate of the air and the pressure ratio that are requested by the fuel cell 20 are determined on the basis of an output request to the fuel cell 20 that corresponds to the detection signals of the accelerator operation amount sensor, the vehicle speed sensor, and the like. The control section 98 sets the requested operating point on the basis of a target flow rate that is a target value of the flow rate of the air discharged from the air compressor 50 and a target pressure ratio that is a target value of the pressure ratio before and after compression by the air compressor 50 (step S120). At this time, the control section 98 executes feedback control on the basis of the flow rate measured by the flow rate sensor 64 and the pressure ratio that is identified from the pressure measured by the cathode pressure sensor 65, and then sets the requested operating point so as to eliminate control deviations between the target flow rate and the actual flow rate and between the target pressure ratio and the actual pressure ratio. In this embodiment, proportional integral differential (PID) control is used as the feedback control. In the PID control, each of the control deviations is controlled by a control amount that includes a proportional term corresponding to the control deviation at the operating point, an integral term of the control deviation, and a derivative term of the control deviation. Note that, instead of the PID control, the feedback control that at least includes the proportional term and the integral term may be executed.

The control section 98 determines whether the target pressure ratio at the requested operating point, which is set in step S120, is lower than the minimum pressure ratio corresponding to the target flow rate at the set requested operating point (step S130). More specifically, the control section 98 refers to the compressor map 94 in which the stall line L5 is predetermined, and thereby determines whether the requested operating point, which is set in step S20, is located on the lower side of the stall line L5.

If the control section 98 determines that the target pressure ratio at the requested operating point is not lower than the minimum pressure ratio that corresponds to the target flow rate at the set requested operating point (step S130: NO), that is, if the control section 98 determines that the target pressure ratio at the requested operating point is equal to or higher than the minimum pressure ratio, the processing returns to step S110. Accordingly, in this case, the control section 98 controls the opening degree of the pressure regulating valve 54 and the rotational speed of the air compressor 50 so as to realize the target flow rate and the target pressure ratio at the requested operating point, which is set in step S120. More specifically, the control section 98 outputs a command to the pressure regulating valve 54 such that the opening degree thereof becomes the opening degree corresponding to such a requested operating point, and also outputs a command to the air compressor 50 such that the air compressor 50 is operated at the rotational speed corresponding to such a requested operating point. In this way, the opening degree of the pressure regulating valve 54 becomes the commanded opening degree, and the air compressor 50 supplies the air to the cathode 24 of the fuel cell 20 at the target flow rate and the target pressure ratio.

On the other hand, if the control section 98 determines that the target pressure ratio at the requested operating point is lower than the minimum pressure ratio that corresponds to the target flow rate at the set requested operating point (step S130: YES), the control section 98 increases the target pressure ratio at the requested operating point, which is set in step S120, to the minimum pressure ratio that corresponds to the target flow rate at the set requested operating point (step S140). After step S140, the processing returns to step S110.

Figure 4:
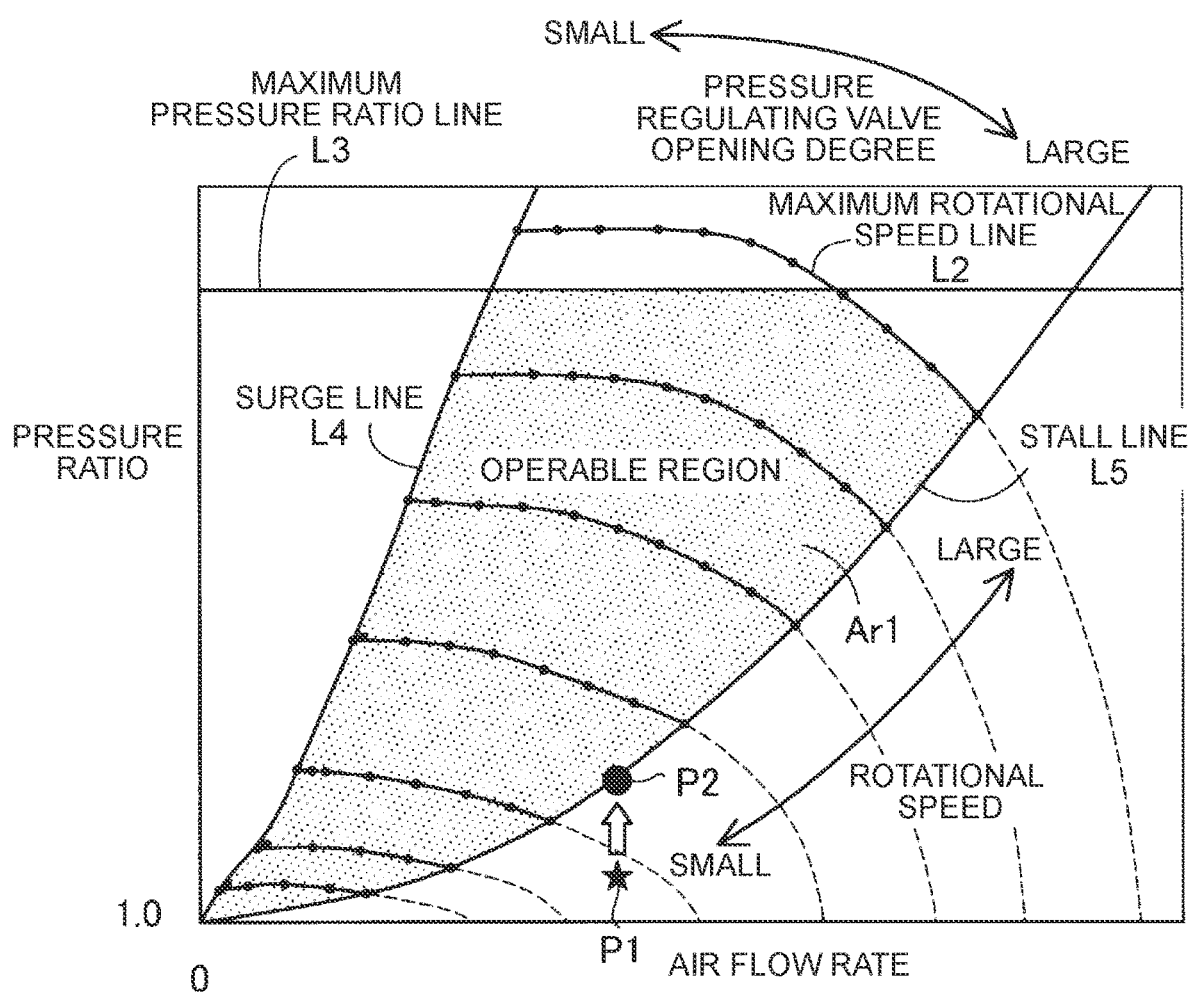
FIG. 4 is an explanatory graph of a result of step S140.

FIG. 4 is an explanatory graph of the result of step S140. In FIG. 4, a requested operating point P1, which is set in step S120, is indicated by a star, and a requested operating point P2, at which the target pressure ratio is increased to the minimum pressure ratio in step S140, is indicated by a big circle on the same graph as that shown in FIG. 2. The requested operating point P1, which is set in step S120, is located on the lower side of the stall line L5. Accordingly, in step S140, the requested operating point is changed from the requested operating point P1, which is set in step S120, to the requested operating point P2 on the stall line L5. Thus, the requested operating point is set within the operable region Ar1 of the air compressor 50. The control section 98 controls the opening degree of the pressure regulating valve 54 and the rotational speed of the air compressor 50 so as to realize the target flow rate and the target pressure ratio at the requested operating point P2, which is changed in step S140. More specifically, the control section 98 outputs a command to the pressure regulating valve 54 such that the opening degree thereof becomes the opening degree corresponding to such a requested operating point P2, that is, a fully-opened opening degree and also outputs a command to the air compressor 50 such that the air compressor 50 is operated at the rotational speed corresponding to such a requested operating point P2. In this way, the opening degree of the pressure regulating valve 54 becomes the fully-opened opening degree, and the air compressor 50 supplies the air to the cathode 24 of the fuel cell 20 at the target flow rate and the target pressure ratio.

Figure 5:
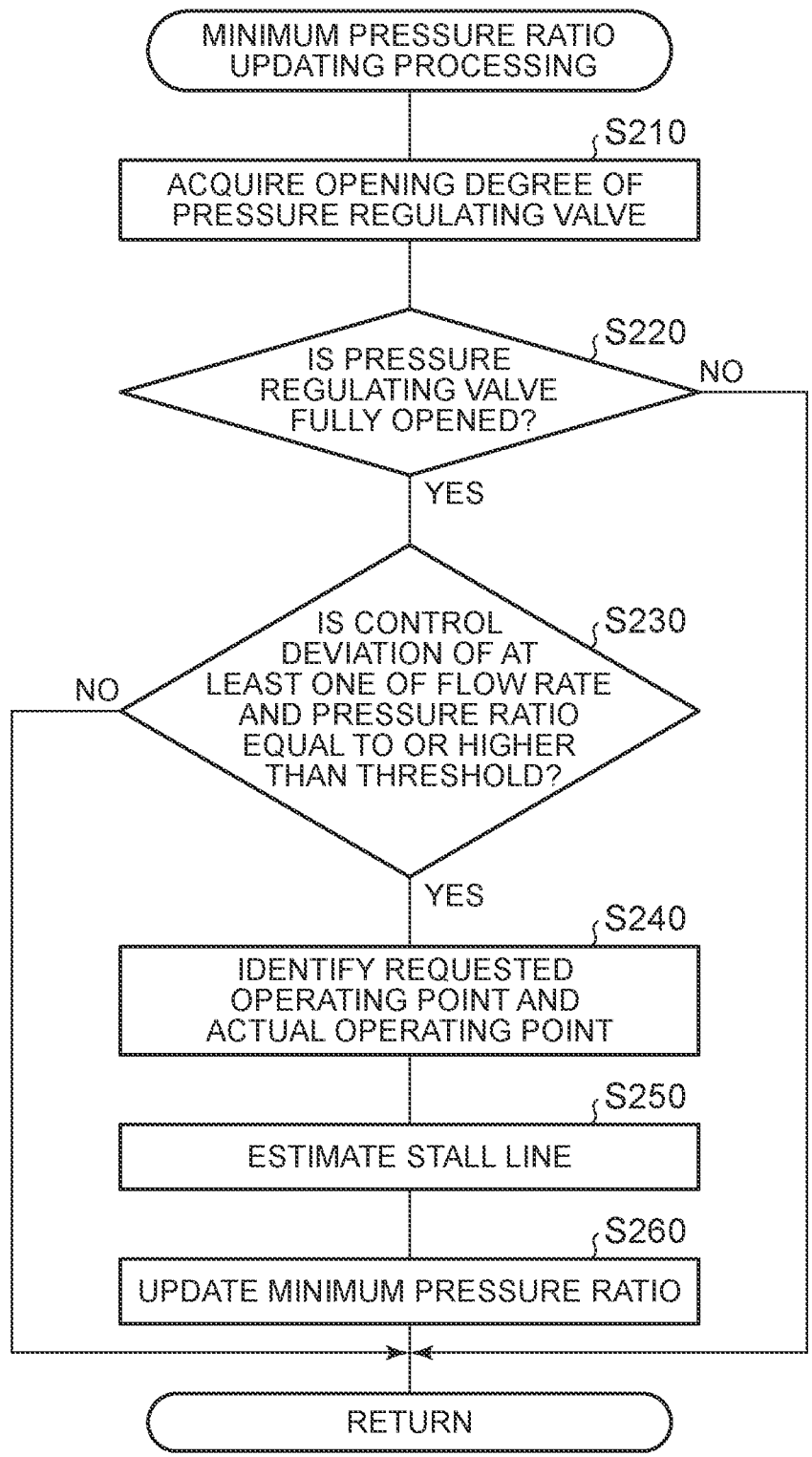
FIG. 5 is a flowchart of a procedure of minimum pressure ratio updating processing.

A-3: Minimum Pressure Ratio Updating Processing:

FIG. 5 is a flowchart of a procedure of the minimum pressure ratio updating processing. The minimum pressure ratio updating processing is repeatedly executed during the execution of the requested operating point setting processing.

The predetermined stall line L5 and an actual stall line of the air compressor 50 possibly deviates from each other due to a manufacturing error of a component(s) that constitutes the air compressor 50 or the like. The predetermined stall line L5 and the actual stall line also possibly deviate from each other due to an environmental change such as of an ambient temperature or an outside pressure, a fluctuation of the pressure loss value caused by a moisture content of the fuel cell 20, or the like. Thus, in the minimum pressure ratio updating processing of this embodiment, in the case where it is assumed that the predetermined stall line L5 and the actual stall line differ from each other, the stall line L5 is updated.

The control section 98 acquires the opening degree of the pressure regulating valve 54 (step S210). The opening degree of the pressure regulating valve 54 is detected by the opening degree sensor (not shown) that is provided in the pressure regulating valve 54. The control section 98 determines whether the pressure regulating valve 54 is fully opened (step S220). In this embodiment, whether the pressure regulating valve 54 is fully opened is determined on the basis of whether the current opening degree of the pressure regulating valve 54 is equal to or larger than a predetermined threshold opening degree indicating that the pressure regulating valve 54 is fully opened. Accordingly, depending on setting of such a threshold, "FULLY OPENED" in step S220 possibly means the slightly smaller opening degree than the maximum opening degree that can be realized by the pressure regulating valve 54.

If the control section 98 determines that the pressure regulating valve 54 is not fully opened (step S220: NO), the processing returns to step S210. On the other hand, if the control section 98 determines that the pressure regulating valve 54 is fully opened (step S220: YES), the control section 98 determines whether the control deviation of at least one of the pressure ratio and the flow rate is equal to or higher than the threshold (the S230). In the case where the control deviation occurs, the requested operating point commanded to the air compressor 50 and the actual operating point are different from each other. In this embodiment, each of the threshold of the control deviation of the pressure ratio and the threshold of the control deviation of the flow rate is predetermined as an upper limit value of the control deviation and is stored as the deviation threshold table 96 in the ROM 92. Accordingly, in step S230, the control section 98 refers to the deviation threshold table 96 and thereby determines whether the control deviation of at least one of the pressure ratio and the flow rate is equal to or higher than the threshold.

If the control section 98 determines that the control deviation of at least one of the pressure ratio and the flow rate is not equal to or higher than the threshold (step S230: NO), that is, if the control deviation is lower than the threshold, the processing returns to step S210. In this case, the control deviation(s) does not occur or falls within a permissible range.

On the other hand, if the control section 98 determines that the control deviation of at least one of the pressure ratio and the flow rate is equal to or higher than the threshold (step S230: YES), the control section 98 identifies the requested operating point, which has been set or changed in the requested operating point setting processing, and the actual operating point of the air compressor 50 (step S240). At this time, the control section 98 identifies the current actual pressure ratio by using the measurement results of the atmospheric pressure sensor 61 and the pressure sensor 63, also identifies the current actual flow rate by using the measurement result of the flow rate sensor 64, and thereby identifies the actual operating point.

The air compressor 50 is operated at the requested operating point, which has been set or changed in the requested operating point setting processing, during the operation of the fuel cell system 10. In addition, the case where the pressure regulating valve 54 is fully opened means that the requested operating point is set on the stall line L5 or changed to the operating point on the stall line L5. Accordingly, in the case where the pressure regulating valve 54 is fully opened, it is expected that the actual operating point of the air compressor 50 matches the requested operating point on the stall line L5. However, in the case where it is determined in step S230 that the control deviation of at least one of the pressure ratio and the flow rate is equal to or higher than the threshold (step S230: YES), the requested operating point and the actual operating point are different from each other. Thus, it is assumed that the predetermined stall line L5 differs from the actual stall line. For this reason, after step S240, the control section 98 estimates the stall line (step S250).

Figure 6:
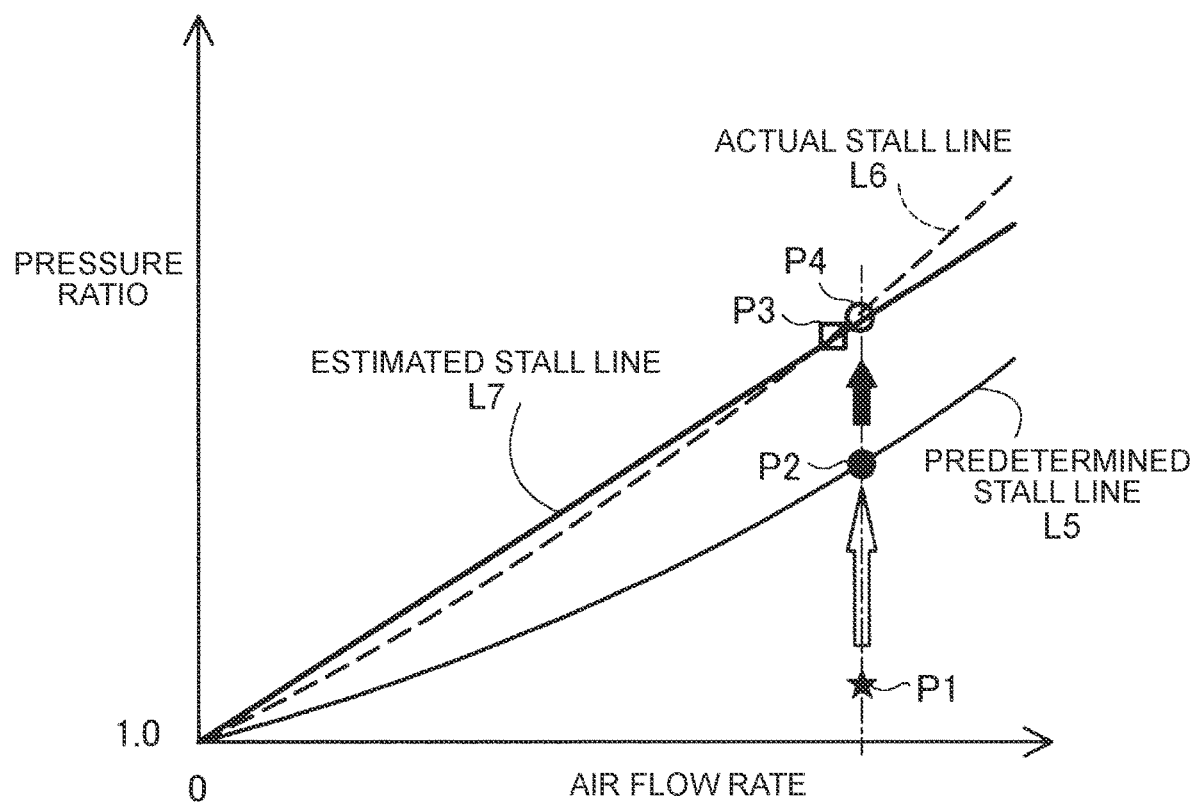
FIG. 6 is an explanatory graph of estimation of a stall line.

FIG. 6 is an explanatory graph of the estimation of the stall line. In FIG. 6, a portion of FIG. 4 that is related to the stall line is shown, an actual operating point P3 is indicated by a blank rectangle, and a requested operating point P4, which is set again and will be described below, is indicated by a blank circle. In addition, in FIG. 6, an actual stall line L6 is drawn by a broken line, and an estimated stall line L7 that is estimated is drawn by a bold solid line. In the example shown in FIG. 6, as indicated by a blank arrow, the requested operating point is changed from the requested operating point P1, which is set in step S120 of the requested operating point setting processing, to the requested operating point P2 on the stall line L5 by step S140.

In FIG. 6, the actual stall line L6 is located on an upper side of the predetermined stall line L5. In this case, the air compressor 50 cannot be operated on a lower side of the actual stall line L6, and the requested operating point P2 on the stall line L5 cannot be realized. As a result, the actual operating point P3 is different from the requested operating point P2, and the control deviation occurs.

In step S250 shown in FIG. 5, the control section 98 estimates the stall line on the basis of the actual operating point P3, which is identified in step S240. At this time, the control section 98 estimates the stall line by using a stall line model formula. The stall line model formula is provided in the predetermined compressor map 94 and is expressed by the following formula (1), for example.

$$P = a \times Q^b \quad (1)$$

In the above formula (1), P represents the pressure ratio, Q represents the flow rate, "a" represents a first stall line coefficient, and "b" represents a second stall line coefficient. The first stall line coefficient and the second stall line coefficient are predetermined. The second stall line coefficient is an arbitrary fixed value that is equal to or larger than 1.0.

The control section 98 estimates the first stall line coefficient by plugging the pressure ratio and the flow rate at the actual operating point P3 into the stall line model formula, and thereby estimates the stall line. In FIG. 6, the estimated stall line L7 is shown.

As shown in FIG. 5, the control section 98 updates the minimum pressure ratio (step S260). More specifically, the predetermined stall line L5 is updated to the estimated stall line L7. That is, in this embodiment, the control section 98 updates the minimum pressure ratio in the case where the pressure regulating valve 54 is fully opened and where the requested operating point and the actual operating point are different from each other. After step S260, the processing returns to step S210.

The control section 98 executes the requested operating point setting processing by using the minimum pressure ratio that is in the minimum pressure ratio updating processing. Accordingly, in the example shown in FIG. 6, as indicated by a black arrow, the requested operating point is set from the requested operating point P2 on the predetermined stall line L5 to the requested operating point P4 on the estimated stall line L7 again. The control section 98 may immediately set the requested operating point again by using the updated minimum pressure ratio in the case where the minimum pressure ratio is updated in the minimum pressure ratio updating processing.

In this embodiment, the actual stall line L6 can be regarded as a specific concept of the minimum value of the pressure ratio in an actual operation characteristic of the turbo compressor in SUMMARY. In addition, the estimated stall line L7 can be regarded as a specific concept of the updated minimum pressure ratio in SUMMARY.

In the fuel cell system 10 of this embodiment that has been described so far, in the requested operating point setting processing, in the case where the target pressure ratio at the set requested operating point is lower than the minimum pressure ratio that correspond to the target flow rate at the requested operating point, the target pressure ratio at the requested operating point is increased to the minimum pressure ratio. Thus, it is possible to suppress the requested operating point from being set within the operating region that cannot be realized by the air compressor 50, and it is also possible to suppress the air compressor 50 from being operated at the requested operating point that cannot be realized. Therefore, it is possible to suppress such a situation where the air compressor 50 keeps being operated at the requested operating point that cannot be realized, which results in degraded performance of the fuel cell system 10.

Here, in the case where the requested operating point remains to be set on the lower side of the stall line L5, the pressure regulating valve 54 is fully opened, and thus the requested operating point cannot be realized. As a result, the control deviation occurs by the difference between the requested operating point and the actual operating point. That is, in the case where the pressure ratio at the actual operating point is higher than the target pressure ratio at the requested operating point, it is attempted to further open the pressure regulating valve 54 that is already in the fully-opened state in order to reduce the pressure ratio. As a result, the feedback integral terms used to control the pressure regulating valve 54 to the opened side are accumulated.

However, in the fuel cell system 10 of this embodiment, in the case where the target pressure ratio at the set requested operating point is lower than the minimum pressure ratio that corresponds to the target flow rate at the requested operating point, the target pressure ratio at the requested operating point is increased to the minimum pressure ratio. In this way, the opening degree of the pressure regulating valve 54 becomes the fully-opened opening degree. Thus, the requested operating point can be realized, and the accumulation of the feedback integral terms can be suppressed. Therefore, it is possible to suppress a delay in the control by the accumulation of the feedback integral terms when the requested operating point is further changed on the basis of the output request to the fuel cell 20, and the like.

In addition, it is possible to suppress a delay in the control to operate the pressure regulating valve 54 to the closed side. Thus, it is possible to suppress the excessive flow rate with respect to the requested flow rate for the fuel cell 20 and to suppress shortage of the pressure with respect to the requested voltage for the fuel cell 20. In this way, it is possible to suppress lowering of the pressure of the cathode 24. Thus, it is possible to suppress the membrane-electrode assembly of the fuel cell 20 from being dried, and thus to suppress degraded power generation performance of the fuel cell 20.

At the requested operating point set in step S120, the target flow rate is not changed, but only the target pressure ratio is changed. Thus, it is possible to suppress the requested flow rate by the fuel cell 20 from not being realized, and thus it is possible to suppress the output request requested to the fuel cell 20 from not being satisfied. In addition, at the requested operating point set in step S120, the target pressure ratio is increased to the minimum pressure ratio (the stall line L5). Thus, it is possible to prevent the target pressure ratio from being excessively increased beyond the minimum pressure ratio (the stall line L5), and thus it is possible to suppress degraded fuel economy. In addition, the target pressure ratio at the requested operating point is increased to the minimum pressure ratio by referring to the predetermined compressor map 94. Thus, it is possible to suppress an increase in a processing load of the CPU 97.

In the fuel cell system 10 of this embodiment, the minimum pressure ratio updating processing is executed. Accordingly, in the case where it should be determined that the actual stall line L6 of the air compressor 50 differs from the predetermined stall line L5, the stall line L5 can be updated. Thus, it is possible to further suppress such a situation where the air compressor 50 is operated at the requested operating point that cannot be realized. As a result, it is possible to further suppress the occurrence of the control deviation and to further suppress the accumulation of the feedback integral terms. Therefore, it is possible to further suppress the delay in the control by the accumulation of such feedback integral terms when the requested operating point is further changed on the basis of the output request to the fuel cell 20, and the like.

The stall line L5 is updated only in the case where it is determined that the actual stall line L6 and the predetermined stall line L5 differ from each other. Thus, it is possible to suppress the increase in the processing load of the CPU 97 in comparison with a configuration that the stall line L5 is updated regardless of the above case. The stall line L5 is updated in the case where the pressure regulating valve 54 is fully opened and where the requested operating point and the actual operating point are different from each other. Thus, the stall line L5 can be updated in the appropriate case where the actual stall line L6 and the predetermined stall line L5 differs from each other with a high possibility. The requested operating point is set again by using the updated minimum pressure ratio. Thus, the target pressure ratio at the requested operating point can be placed on the actual stall line L6, and thus the accumulation of the feedback integral terms can further be suppressed.

B. Second Embodiment

Figure 7:
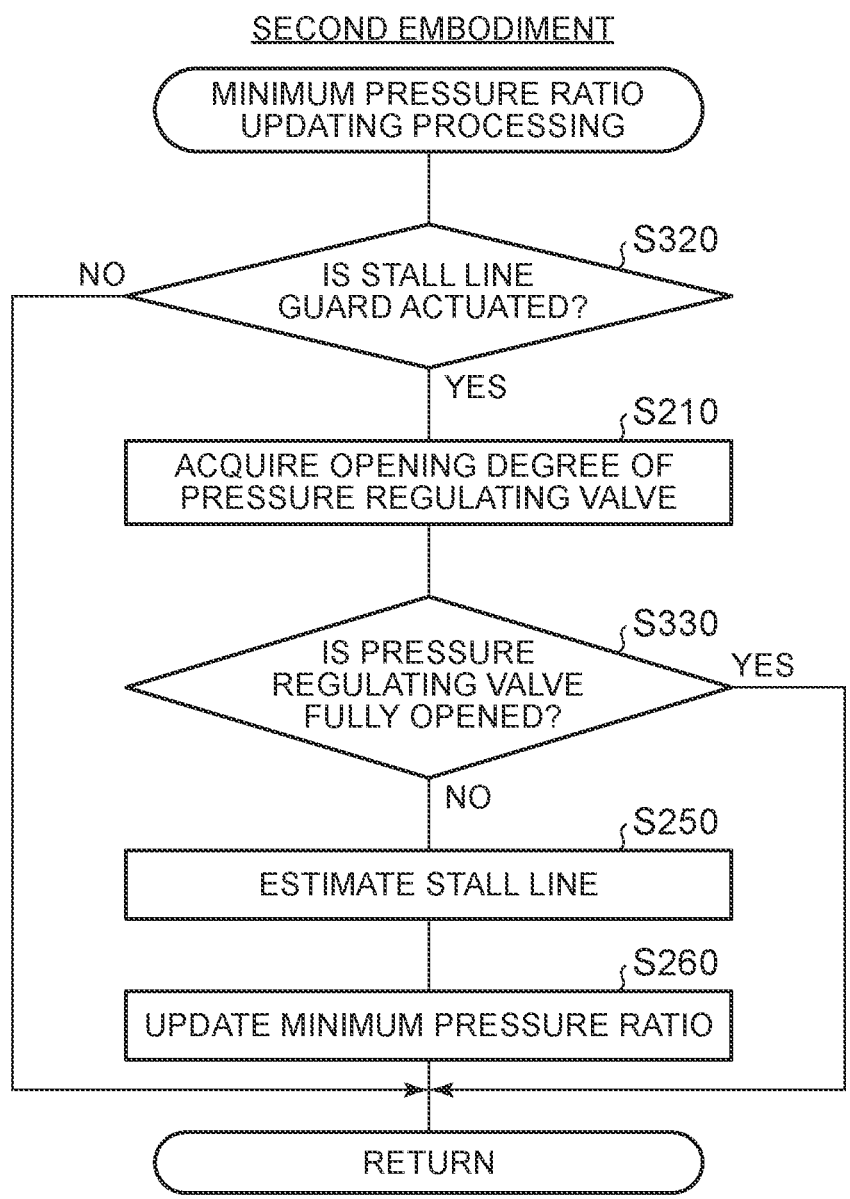
FIG. 7 is a flowchart of a procedure of minimum pressure ratio updating processing in a second embodiment.

FIG. 7 is a flowchart of a procedure of minimum pressure ratio updating processing in a second embodiment. In the minimum pressure ratio updating processing, a fuel cell system 10 in the second embodiment differs from the fuel cell system 10 in the first embodiment. The minimum pressure ratio updating processing in the second embodiment differs from the minimum pressure ratio updating processing in the first embodiment in a point that step S320 and step S330 are executed instead of step S220 and step S230, in a point that step S210 is executed after step S320, in a point that step S240 is eliminated, and in terms of specific contents of the processing in step S250. The rest of the configuration including the system configuration is the same as that in the first embodiment. Thus, the same components will be denoted by the same reference numerals, and the detailed description thereon will not be made.

In the minimum pressure ratio updating processing of the second embodiment, the control section 98 initially determines whether a stall line guard is actuated (step S320). The stall line guard means that the determination in step S130 of the requested operating point setting processing is YES, step S140 is executed, and the requested operating point is lifted onto the stall line L5. If the control section 98 determines that the stall line guard is not actuated (step S320: NO), the processing returns to step S320.

On the other hand, if the control section 98 determines that the stall line guard is actuated (step S320: YES), the control section 98 acquires the opening degree of the pressure regulating valve 54 (step S210). Then, the control section 98 determines whether the pressure regulating valve 54 is fully opened (step S330). Whether the pressure regulating valve 54 is fully opened may be determined on the basis of whether the current opening degree of the pressure regulating valve 54 is smaller than the predetermined threshold opening degree indicating that the pressure regulating valve 54 is fully opened. If the control section 98 determines that the pressure regulating valve 54 is fully opened (step S330: YES), the processing returns to step S320.

On the other hand, if the control section 98 determines that the pressure regulating valve 54 is not fully opened (step S330: NO), the control section 98 estimates the stall line (step S250).

Figure 8:
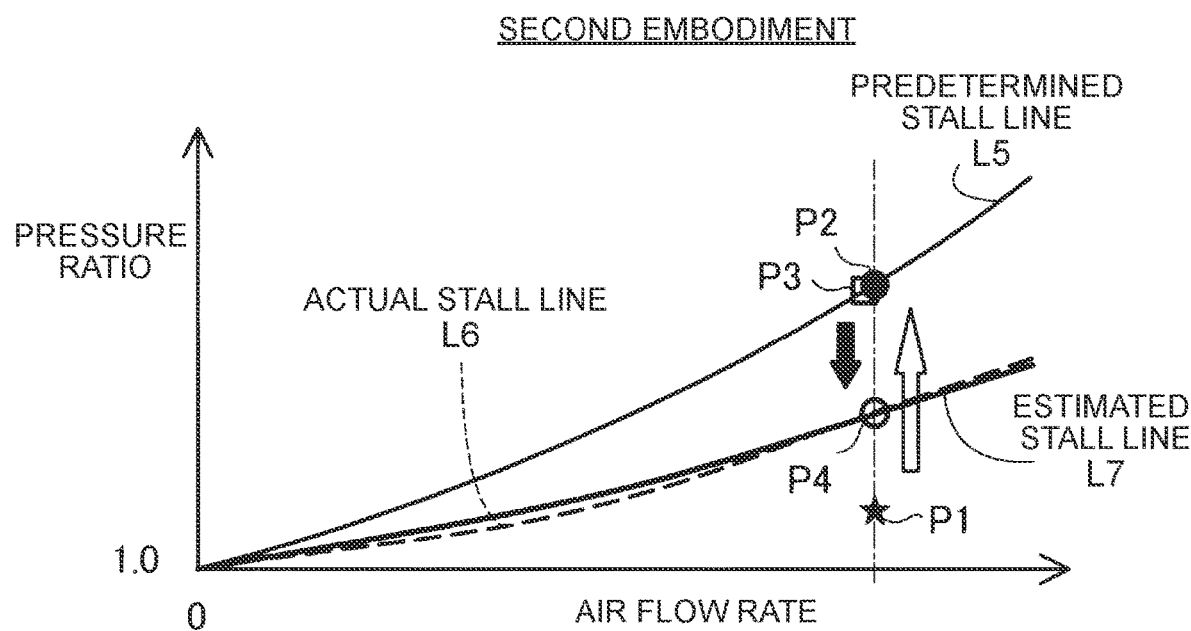
FIG. 8 is an explanatory graph of estimation of a stall line in the second embodiment.

FIG. 8 is an explanatory graph of the estimation of the stall line in the second embodiment. In FIG. 8, the actual stall line L6 indicated by a broken line is located on the lower side of the predetermined stall line L5. A difference between the actual stall line L6 and the stall line L5 occurs by the manufacturing error of the component such as a pipe that constitutes the air compressor 50 or the oxidizing gas supply channel 32, or the like. In such a case, the target pressure ratio at the requested operating point P2 that is increased to be located on the predetermined stall line L5 by the stall line guard is excessively higher than the minimum pressure ratio (on the actual stall line L6) in the actual operation characteristic of the air compressor 50. Thus, in the case where the minimum pressure ratio is not updated, due to the actuation of the stall line guard, the pressure ratio at the actual operating point P3 becomes excessively higher than the minimum pressure ratio (on the actual stall line L6) in the actual operation characteristic of the air compressor 50.

In step S250 shown in FIG. 7, the control section 98 estimates the stall line by using the opening degree of the pressure regulating valve 54, which is acquired in step S210, and the stall line model formula. The stall line model formula is expressed by the above formula (1), for example.

The control section 98 corrects the first stall line coefficient, which is expressed as "a" in the above formula (1), by using the following formula (2), for example.

$$a[t+1]=a[t]-k\times(\theta o-\theta) \qquad (2)$$

In the above formula (2), "t" represents a calculation cycle, "k" represents a correction gain, $\theta o$ represents the fully-opened opening degree of the pressure regulating valve 54, and $\theta$ represents the current opening degree of the pressure regulating valve 54. That is, "$\theta o-\theta$" in the above formula (2) represents the control deviation of the pressure regulating valve 54. The correction gain means a coefficient that indicates a degree of the correction, and is predetermined as an arbitrary fixed value that is equal to or smaller than 1.0. As a numerical value of the correction gain is increased, a correction amount is increased.

The control section 98 estimates the stall line by plugging the corrected first stall line coefficient into the stall line model formula. In FIG. 8, the estimated stall line L7 is drawn by a bold solid line.

The control section 98 updates the minimum pressure ratio (step S260). More specifically, the predetermined stall line L5 is updated to the estimated stall line L7. In the example shown in FIG. 8, as indicated by a black arrow, the requested operating point is set from the requested operating point P2 on the predetermined stall line L5 to the requested operating point P4 on the estimated stall line L7 again.

The fuel cell system 10 in the second embodiment that has been described so far exerts similar effects to those of the fuel cell system 10 in the first embodiment. In addition, since it is possible to prevent setting of the target pressure ratio at the requested operating point from becoming excessively higher than the minimum pressure ratio in the actual operation characteristic of the air compressor 50 (the actual stall line L6), the degraded fuel economy can be suppressed. Furthermore, since the stall line L5 is updated only when the stall line guard is actuated, it is possible to suppress an increase in a processing load of the CPU 97. Moreover, it is not necessary to predetermine and store the plural stall lines L5 by assuming the manufacturing error of the component, or the like. Thus, capacity of the ROM 92 can be reduced.

C. Third Embodiment

Figure 9:
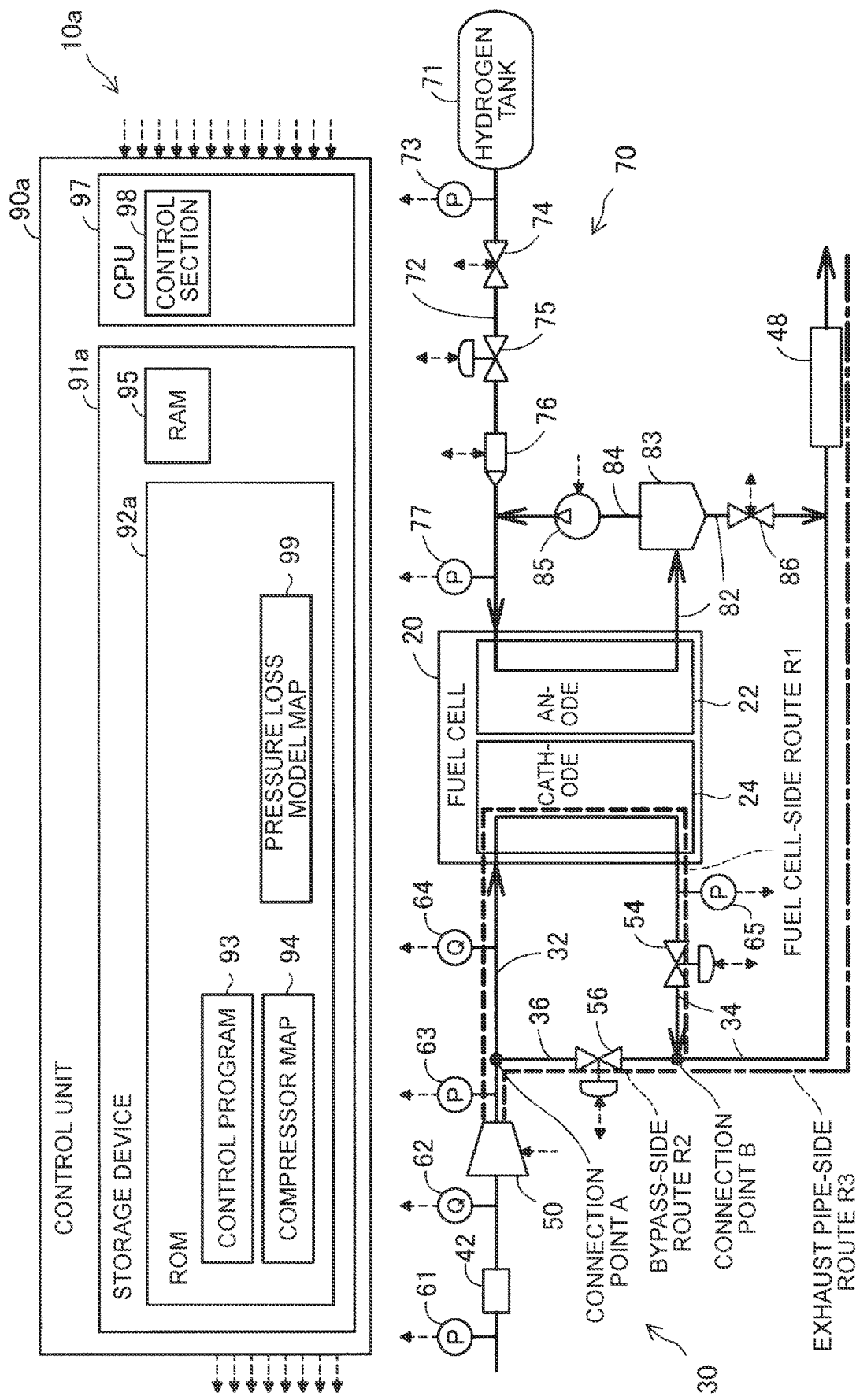
FIG. 9 is an explanatory diagram of a schematic configuration of a fuel cell system in a third embodiment.
Figure 10:
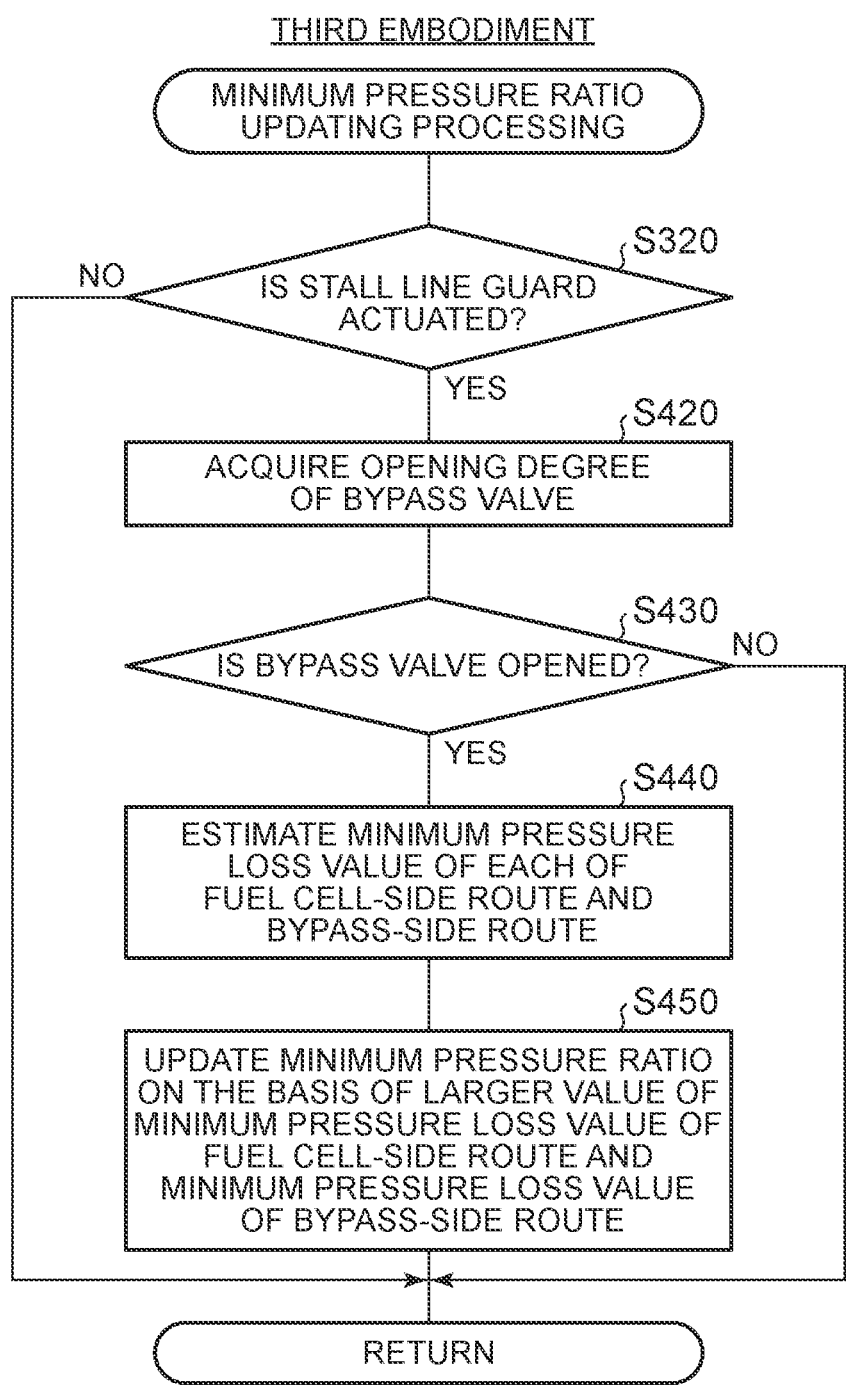
FIG. 10 is a flowchart of a procedure of minimum pressure ratio updating processing in the third embodiment.

FIG. 9 is an explanatory diagram of a schematic configuration of a fuel cell system 10a in a third embodiment. FIG. 10 is a flowchart of a procedure of minimum pressure ratio updating processing in the third embodiment. The fuel cell system 10a in the third embodiment differs from the fuel cell system 10 in the second embodiment in a point that a pressure loss model map 99 is further stored and in terms of the procedure of the minimum pressure ratio updating processing. The minimum pressure ratio updating processing in the third embodiment differs from the minimum pressure ratio updating processing in the second embodiment in a point that step S420, step S430, step S440, and step S450 are executed instead of step S210, step S330, step S250, and step S260. The rest of the configuration of the fuel cell system 10a is the same as that of the fuel cell system 10 in the second embodiment. Thus, the same components will be denoted by the same reference numerals, and the detailed description thereon will not be made.

As shown in FIG. 9, in a control unit 90a of the fuel cell system 10a in the third embodiment, instead of the deviation threshold table 96, the pressure loss model map 99 that is created in advance is installed in a ROM 92a of a storage device 91a. In the pressure loss model map 99, a pressure loss value in each of a fuel cell-side route R1 and a bypass-side route R2, which are indicated by broken lines in FIG. 9, and a pressure loss value in an exhaust pipe-side route R3, which is indicated by a one-dot chain line in FIG. 9, are obtained and determined in advance by an experiment. The pressure loss value in each of the routes R1, R2, R3 fluctuates in accordance with the flow rate at the time. The fuel cell-side route R1 means a route from the exit of the air compressor 50 to the connection point B through the connection point A, the fuel cell 20, and the pressure regulating valve 54. The bypass-side route R2 means a route from the exit of the air compressor 50 to the connection point B through the connection point A, the bypass channel 36, and the bypass valve 56. The exhaust pipe-side route R3 means a route on a downstream side of the connection point B in the oxidizing gas exhaust channel 34.

As shown in FIG. 10, in the minimum pressure ratio updating processing of the third embodiment, the control section 98 determines whether the stall line guard is actuated (step S320). If the control section 98 determines that the stall line guard is not actuated (step S320: NO), the processing returns to step S320.

On the other hand, if the control section 98 determines that the stall line guard is actuated (step S320: YES), the control section 98 acquires the opening degree of the bypass valve 56 (step S420). The opening degree of the bypass valve 56 is detected by the opening degree sensor (not shown) that is provided in the bypass valve 56. Then, the control section 98 determines whether the bypass valve 56 is opened (step S430). If the control section 98 determines that the bypass valve 56 is not opened, that is, the bypass valve 56 is closed (step S430: NO), the processing returns to step S320.

On the other hand, if the control section 98 determines that the bypass valve 56 is opened (step S430: YES), the control section 98 estimates a minimum pressure loss value of each of the fuel cell-side route R1 and the bypass-side route R2 (step S440).

Figure 11:
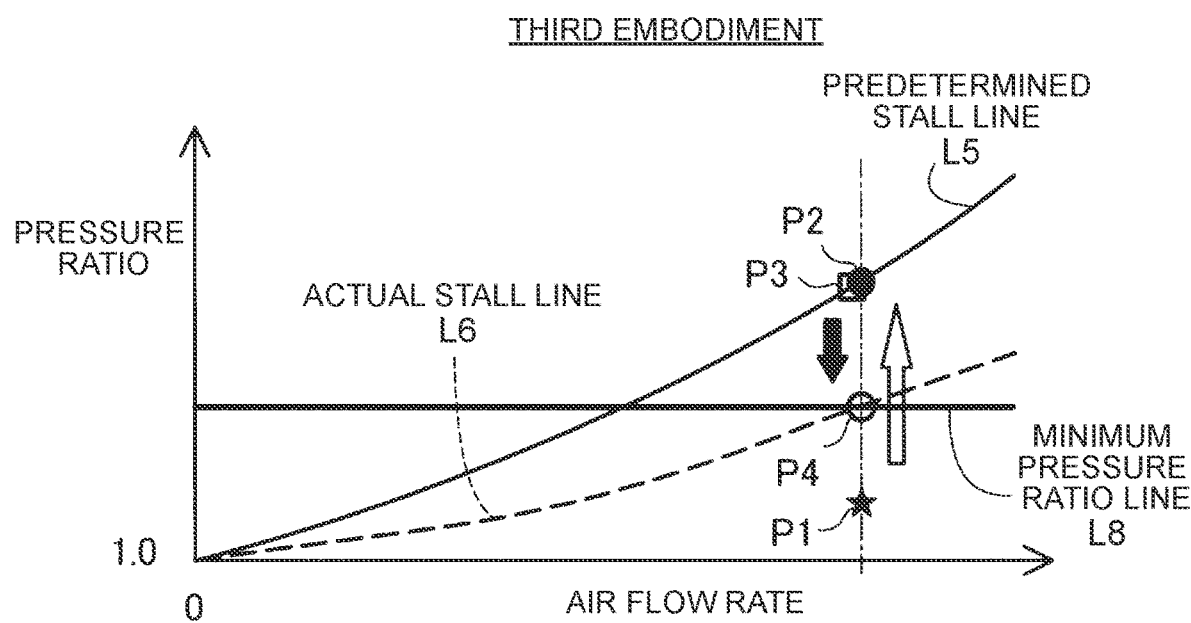
FIG. 11 is an explanatory graph of a stall line in the case where a bypass valve is opened.

FIG. 11 is an explanatory graph of the stall line in the case where the bypass valve 56 is opened. In the case where the bypass valve 56 is opened, the air that is delivered from the air compressor 50 flows not only through the fuel cell-side route R1 but also through the bypass-side route R2. For this reason, the actual stall line L6, which is indicated by a broken line in FIG. 11, is located on the lower side of the predetermined stall line L5. Thus, in the case where the bypass valve 56 is opened, the target pressure ratio at the requested operating point P2 that is increased to be located on the predetermined stall line L5 by the stall line guard is excessively higher than the minimum pressure ratio in the actual operation characteristic of the air compressor 50. Therefore, in the case where the minimum pressure ratio is not updated, due to the actuation of the stall line guard, the pressure ratio at the actual operating point P3 becomes excessively higher than the minimum pressure ratio in the actual operation characteristic of the air compressor 50.

The bypass valve 56 is normally closed, and is opened in response to the command from the control section 98. The bypass valve 56 is opened in the case where the target flow rate at the requested operating point of the air compressor 50 is increased for a purpose of avoiding the surging, for example. In this case, the target flow rate at the requested operating point of the air compressor 50 can be increased by opening the bypass valve 56 without changing the flow rate to the fuel cell 20. In addition, the bypass valve 56 is opened in the case where the rotational speed of the air compressor 50 as one of auxiliary machines is increased in order to consume regenerative power by driving the auxiliary machines when a secondary battery (not shown) that is provided in the fuel cell system 10 is fully charged. Furthermore, the bypass valve 56 is opened for a purpose of diluting hydrogen. Hydrogen is diluted in the case where concentration of hydrogen in the cathode 24 is in a relatively high state immediately after a start of the fuel cell system 10a because hydrogen that remains in the anode 22 at a stop of the fuel cell system 10a has moved to the cathode 24 due to cross leakage, in the case where the exhaust/drain valve 86 is opened, or the like.

In this embodiment, in step S440, the each of minimum pressure loss values is estimated by using the target flow rate at the requested operating point and the pressure loss model map 99. The minimum pressure loss value of the fuel cell-side route R1 corresponds to the pressure loss value that is generated in the fuel cell-side route R1 at the time when the air at the target flow rate at the requested operating point flows therethrough in the case where the pressure regulating valve 54 is fully opened. The minimum pressure loss value of the bypass-side route R2 corresponds to the pressure loss value that is generated in the bypass-side route R2 at the time when the air at the target flow rate at the requested operating point flows therethrough in the case where the bypass valve 56 is fully opened.

The control section 98 updates the minimum pressure ratio on the basis of the larger value of the minimum pressure loss value of the fuel cell-side route R1 and the minimum pressure loss value of the bypass-side route R2 (step S450). More specifically, a total value of the minimum pressure loss value is calculated by adding the pressure loss value that is generated in the exhaust pipe-side route R3 at the time when the air at the target flow rate at the requested operating point flows therethrough to the larger value of the minimum pressure loss value of the fuel cell-side route R1 and the minimum pressure loss value of the bypass-side route R2. Then, the calculated total value is converted to the pressure ratio and set as the minimum pressure ratio. The conversion to the pressure ratio can be made by dividing a value that is acquired by adding the atmospheric pressure to such a total value by the atmospheric pressure. In FIG. 11, a minimum pressure ratio line L8 indicative of the minimum pressure ratio that has been updated in step S450 is drawn by a bold solid line. The minimum pressure ratio line L8 is constant regardless of the flow rate at the operating point of the air compressor 50. In the example shown in FIG. 11, as indicated by a black arrow, the requested operating point is set from the requested operating point P2 on the predetermined stall line L5 to the requested operating point P4 on the minimum pressure ratio line L8 again. The requested operating point P4 on the minimum pressure ratio line L8 is located on the actual stall line L6.

In this embodiment, the minimum pressure ratio line L8 can be regarded as the specific concept of the minimum value of the pressure ratio in the actual operation characteristic of the turbo compressor and a specific concept of the updated minimum pressure ratio in SUMMARY.

The fuel cell system 10a in the third embodiment that has been described so far exerts similar effects to those of the fuel cell system 10 in the second embodiment. In addition, the minimum pressure ratio is updated in the case where the bypass valve 56 is opened from the fully closed state. Thus, a situation where the stall line L5 and the actual stall line L6 differ from each other can appropriately be determined. Furthermore, the minimum pressure ratio is updated only in the case where the bypass valve 56 is opened from the fully closed state. Thus, it is possible to suppress the increase in the processing load of the CPU 97.

D. Other Embodiments (1) In the requested operating point setting processing of the above embodiment, the requested operating point is changed by referring to the predetermined compressor map 94. However, the disclosure is not limited thereto. Instead of referring to the compressor map 94, the stall line L5 may be calculated and identified on the basis of the detection signals of the various sensors during the operation of either one of the fuel cell systems 10, 10a. For example, the stall line L5 may be identified by identifying the one or plural operating points on the basis of the detection signals of the pressure sensor 63 and the flow rate sensor 64 at fully opened timing of the pressure regulating valve 54 and plugging the flow rate and the pressure ratio at each of the operating points into the model formula. With such a configuration, similar effects to those of the above embodiments are exerted. In addition, the capacity of the ROM 92 in the storage device 91 can be reduced. Furthermore, the stall line L5 can be identified in accordance with the fluctuation of the pressure loss value caused by the manufacturing error of the component constituting the air compressor 50 or the like, the ambient temperature, the outside pressure, or the moisture content of the fuel cell 20, or the like. Thus, an error of the stall line L5 can be suppressed. Moreover, the requested operating point may initially be set on the stall line L5 by using a lookup table or the like that is created in advance, for example. The requested operating point may be set to be equal to or higher than the minimum pressure ratio. That is, in general, when the requested operating point is set, the target pressure ratio may be set to be equal to or higher than the minimum pressure ratio that corresponds to the target flow rate by using the predetermined operation characteristic in which the minimum pressure ratio is predetermined. The minimum pressure ratio is the minimum value of the pressure ratio that can be realized with respect to the flow rate of the air that can be discharged from the air compressor 50. For example, the control section 98 may control the operations of the air compressor 50 and the pressure regulating valve 54 in accordance with the rotational speed of the air compressor 50 that is requested at the low temperature or during the dilution of hydrogen, in addition to the output request to the fuel cell 20. Also, with such a configuration, similar effects to those of the above embodiments are exerted.

(2) In the compressor map 94 in the above embodiment, the vertical axis represents the pressure ratio of the air compressor 50. However, instead of the pressure ratio, the vertical axis may represent the pressure of the air that is discharged from the air compressor 50 or may be the pressure lass value. In such a configuration, the pressure ratio of the air compressor 50 may be calculated on the basis of the pressure of the air, which is discharged from the air compressor 50, or the pressure loss value. Then, the requested operating point that indicates the target pressure ratio as the target value of such a pressure ratio and the target flow rate may be set. Also, with such a configuration, similar effects to those of the above embodiments are exerted.

(3) The minimum pressure ratio updating processing in the above embodiment is merely one example, and thus various changes can be made thereto. The minimum pressure ratio is updated in the case where the actual stall line L6 is located on the upper side of the stall line L5 in the first embodiment, in the case where the actual stall line L6 is located on the lower side of the stall line L5 in the second embodiment, and in the case where the bypass valve 56 is opened in the third embodiment. However, the disclosure is not limited thereto. The minimum pressure ratio may be updated in an arbitrary case where a predetermined condition is satisfied. The predetermined condition is that it should be determined that the minimum pressure ratio in the predetermined operation characteristic (the stall line L5) and the minimum value of the pressure ratio in the actual operation characteristic of the air compressor 50 (the actual stall line L6) differs from each other. In addition, the minimum pressure ratio updating processing in each of the embodiments may be executed in parallel, and the minimum pressure ratio may be updated in the case where at least one of the plural conditions, under each of which it should be determined that the stall line L5 and the actual stall line L6 differ from each other, is satisfied. Also, with such a configuration, similar effects to those of the above embodiments are exerted.

(4) In the above embodiment, the control section 98 immediately sets the requested operating point again by using the updated minimum pressure ratio in the case where the minimum pressure ratio is updated in the minimum pressure ratio updating processing. However, the updated minimum pressure ratio may be used in the next requested operating point setting processing. Also, with such a configuration, similar effects to those of the above embodiments are exerted.

(5) In the minimum pressure ratio updating processing of the first embodiment, in the case where the control deviation of at least one of the pressure ratio and the flow rate is equal to or higher than the threshold, the stall line is estimated, and the minimum pressure ratio is updated. However, the disclosure is not limited thereto. For example, in the case where the control deviation of at least one of the pressure ratio and the flow rate occurs for a predetermined threshold time or longer, the stall line may be estimated, and the minimum pressure ratio may be updated. With such a configuration, hunting can be suppressed. That is, in general, in the case where the pressure regulating valve 54 is fully opened and where the requested operating point and the actual operating point are different from each other, the minimum pressure ratio may be updated. Alternatively, in the case where the pressure regulating valve 54 is fully opened and where the requested operating point and the actual operating point are different from each other for a predetermined time or longer, the minimum pressure ratio may be updated. Also, with such a configuration, similar effects to those of the first embodiment are exerted.

(6) In the minimum pressure ratio updating processing of the second embodiment, in the case where the pressure regulating valve 54 is not fully opened during the actuation of the stall line guard, the stall line is estimated, and the minimum pressure ratio is updated. However, the disclosure is not limited thereto. For example, the stall line may be estimated, and the minimum pressure ratio may be updated not only during the actuation of the stall line guard but also in the case where the pressure ratio at the requested operating point matches the predetermined stall line L5. In other words, the stall line may be estimated, and the minimum pressure ratio may be updated in the case where the pressure regulating valve 54 is not fully opened and where the requested operating point is set on the predetermined stall line L5 in step S120 of the requested operating point setting processing. That is, in general, in the case where the pressure regulating valve 54 is not fully opened and where the pressure ratio at the actual operating point matches the minimum pressure ratio (on the stall line L5) in the predetermined operation characteristic, the minimum pressure ratio may be updated. Also, with such a configuration, similar effects to those of the second embodiment are exerted.

(7) In the minimum pressure ratio updating processing of the third embodiment, in the case where the bypass valve 56 is opened during the actuation of the stall line guard, the minimum pressure ratio is updated. However, the disclosure is not limited thereto. For example, the minimum pressure ratio may be updated not only during the actuation of the stall line guard but also in the case where the bypass valve 56 is opened from the fully closed state. In addition, for example, the minimum pressure ratio may further be updated by the minimum pressure ratio updating processing in the case where, after the minimum pressure ratio is updated in the minimum pressure ratio updating processing of the third embodiment, the opening degree of the bypass valve 56 is further changed. That is, in general, the minimum pressure ratio may be updated in the case where the opening degree of the bypass valve 56 is changed. Also, with such a configuration, similar effects to those of the above embodiments are exerted.

(8) The configuration of each of the fuel cell systems 10, 10a in the above embodiments is merely one example, and various changes can be made thereto. For example, in each of the fuel cell systems 10, 10a, the pressure regulating valve 54 is arranged in the oxidizing gas exhaust channel 34. However, the pressure regulating valve 54 may be arranged in the oxidizing gas supply channel 32 instead of the oxidizing gas exhaust channel 34. In addition, for example, in order to keep a temperature of the fuel cell 20 within a specified range, each of the fuel cell systems 10, 10a may further include a refrigerant circulation system that cools the fuel cell 20. Also, with such a configuration, similar effects to those of the above embodiments are exerted.

(9) In the above embodiment, each of the fuel cell systems 10, 10a is mounted on and used in the fuel cell vehicle. However, each of the fuel cell systems 10, 10a may be mounted on another arbitrary moving body such as a watercraft or a robot instead of the vehicle, and may be used as a stationary fuel cell. Also, with such a configuration, similar effects to those of the above embodiments are exerted.

The disclosure is not limited to the above-described embodiments and can be implemented by having any of various configurations within the scope that does not depart from the gist thereof. For example, technical features in the embodiments that correspond to technical features in the aspects described in SUMMARY can appropriately be replaced or combined to solve a part or the whole of the above-described problem or to achieve some or all of the above-described effects. In addition, when any of those technical features is not described as being essential in the present specification, the technical feature(s) can appropriately be eliminated.

What is claimed is:

1. A fuel cell system comprising:
    a fuel cell;
    a turbo compressor that supplies oxidizing gas to the fuel cell;
    a pressure regulating valve that regulates a pressure of the oxidizing gas in the fuel cell; and
    an electronic control unit that controls the turbo compressor and the pressure regulating valve in accordance with at least an output request to the fuel cell, wherein
    the electronic control unit is programmed to:
        set a requested operating point of the turbo compressor by using a target flow rate and a target pressure ratio, the target flow rate being a target value of a flow rate of the oxidizing gas that is discharged from the turbo compressor, and the target pressure ratio being a target value of a pressure ratio that is a ratio of a pressure of the oxidizing gas discharged from the turbo compressor to a pressure of the oxidizing gas that is suctioned into the turbo compressor;
        when the requested operating point is set, set the target pressure ratio to be equal to or higher than a minimum pressure ratio that corresponds to the target flow rate by using a predetermined operation characteristic in which the minimum pressure ratio is predetermined, the minimum pressure ratio being a minimum value of the pressure ratio that can be realized with respect to the flow rate of the oxidizing gas that can be discharged from the turbo compressor; and in a case where a predetermined condition under which it should be determined that the minimum value of the pressure ratio in an actual operation characteristic of the turbo compressor differs from the minimum pressure ratio in the predetermined operation characteristic is satisfied, update the minimum pressure ratio in the predetermined operation characteristic by using the minimum value of the pressure ratio in the actual operation characteristic.

2. The fuel cell system according to claim 1, wherein the electronic control unit is programmed to set the target pressure ratio at the requested operating point again by using the updated minimum pressure ratio.

3. The fuel cell system according to claim 1 further comprising:

a pressure sensor that identifies the pressure ratio; and
a flow rate sensor that identifies the flow rate, wherein
the electronic control unit is programed to identify an actual operating point as an operating point that indicates an actual pressure ratio and an actual flow rate of the turbo compressor by using a measurement result of the pressure sensor and a measurement result of the flow rate sensor, and
the predetermined condition is a condition that the pressure regulating valve is fully opened and that the requested operating point and the actual operating point are different from each other.

4. The fuel cell system according to claim 3, wherein the predetermined condition is a condition that the pressure regulating valve is fully opened and that the requested operating point and the actual operating point are different from each other for a predetermined time or longer.

5. The fuel cell system according to claim 1 further comprising:

a pressure sensor that identifies the pressure ratio; and
a flow rate sensor that identifies the flow rate, wherein
the electronic control unit is programmed to identify an actual operating point as an operating point that indicates an actual pressure ratio and an actual flow rate of the turbo compressor by using a measurement result of the pressure sensor and a measurement result of the flow rate sensor, and the predetermined condition is a condition that the pressure regulating valve is not fully opened and that the actual pressure ratio at the actual operating point matches the minimum pressure ratio in the predetermined operation characteristic.

6. The fuel cell system according to claim 1 further comprising:

an oxidizing gas supply channel through which the oxidizing gas is supplied from the turbo compressor to the fuel cell;
an oxidizing gas exhaust channel through which the oxidizing gas is discharged from the fuel cell;
a bypass channel that communicates between the oxidizing gas supply channel and the oxidizing gas exhaust channel; and
a bypass valve provided on the bypass channel, wherein
the predetermined condition is a condition that an opening degree of the bypass valve is changed.

7. The fuel cell system according to claim 6, wherein the predetermined condition is a condition that the bypass valve is opened from a fully closed state.

* * * * *

UNITED STATES PATENT AND TRADEMARK OFFICE
CERTIFICATE OF CORRECTION

PATENT NO. : 10,879,546 B2
APPLICATION NO. : 16/278843
DATED : December 29, 2020
INVENTOR(S) : Naoki Tomi and Shigeki Hasegawa It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Aichi-ken" and insert --Aichi-gun Aichi-ken--, therefor.

Item (72), inventor 2, city, delete "Toyota" and insert --Toyota-shi Aichi-ken--, therefor.

Item (73), assignee, city, delete "Toyota" and insert --Toyota-shi Aichi-ken--, therefor.

In the Specification

In Column 9, Line(s) 35, delete "LA" and insert --L4--, therefor.

In Column 9, Line(s) 37, delete "LA" and insert --L4--, therefor.

In Column 9, Line(s) 41, delete "IA" and insert --L4--, therefor.

In Column 10, Line(s) 61, delete "S20" and insert --S120--, therefor.

In Column 20, Line(s) 41, delete "lass" and insert --loss--, therefor.

In the Claims

In Column 23, Line(s) 18, Claim 3, after "claim 1", insert --,--.

In Column 23, Line(s) 22, Claim 3, delete "programed" and insert --programmed--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

In Column 24, Line(s) 4, Claim 5, after "claim 1", insert --,--.

In Column 24, Line(s) 18, Claim 6, after "claim 1", insert --,--.